(12) United States Patent
Nozawa et al.

(10) Patent No.: US 12,501,123 B2
(45) Date of Patent: Dec. 16, 2025

(54) IMAGING APPARATUS

(71) Applicant: Panasonic Intellectual Property Management Co., Ltd., Osaka (JP)

(72) Inventors: Katsuya Nozawa, Osaka (JP); Motoki Yako, Osaka (JP); Takayuki Kiyohara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 183 days.

(21) Appl. No.: 18/499,287

(22) Filed: Nov. 1, 2023

(65) Prior Publication Data
US 2024/0073495 A1 Feb. 29, 2024

Related U.S. Application Data

(63) Continuation of application No. PCT/JP2022/019754, filed on May 10, 2022.

(30) Foreign Application Priority Data

May 20, 2021 (JP) ................... 2021-085319

(51) Int. Cl.
H04N 23/11 (2023.01)
H04N 23/16 (2023.01)
H04N 23/56 (2023.01)

(52) U.S. Cl.
CPC ............ H04N 23/11 (2023.01); H04N 23/16 (2023.01); H04N 23/56 (2023.01)

(58) Field of Classification Search
CPC ........ H04N 23/11; H04N 23/16; H04N 23/56; H04N 23/12; G01J 3/36; G01J 3/443; G01N 21/64
See application file for complete search history.

(56) References Cited

U.S. PATENT DOCUMENTS

2010/0145416 A1* 6/2010 Kang ................ A61N 5/062
607/90
2010/0188491 A1 7/2010 Shizukuishi
(Continued)

FOREIGN PATENT DOCUMENTS

JP 2000-097859 4/2000
JP 2005-198794 7/2005
(Continued)

OTHER PUBLICATIONS

International Search Report of PCT application No. PCT/JP2022/019754 dated Aug. 2, 2022.
(Continued)

Primary Examiner — Kiho Kim
(74) Attorney, Agent, or Firm — Wenderoth, Lind & Ponack, L.L.P.

(57) ABSTRACT

An imaging apparatus includes: at least one light source that emits excitation light for irradiating an object including at least one light emitter; a coding filter array including filters whose transmission spectra differ from each other; an image sensor that captures an image of object light, which is generated by irradiating the object with the excitation light, through the coding filter array and generates compressed image data; and a processing circuit that generates hyperspectral image data based on the compressed image data. The object light includes emission light, which is produced by the at least one light emitter by absorbing the excitation light, and reflection light of the excitation light reflected by the object. The filters include two filters whose transmission spectra differ from each other. A spectrum of the excitation light overlaps a transmission region in the transmission spectrum of each of the two filters.

11 Claims, 15 Drawing Sheets

(56) References Cited

U.S. PATENT DOCUMENTS

| | | |
|---|---|---|
| 2014/0253713 A1 | 9/2014 | Zhai et al. |
| 2015/0105668 A1 | 4/2015 | Ehrhardt et al. |
| 2016/0138975 A1 | 5/2016 | Ando et al. |
| 2017/0003168 A1* | 1/2017 | Fujii .................... G01J 3/2803 |
| 2017/0176336 A1 | 6/2017 | Dimitriadis et al. |
| 2019/0353596 A1 | 11/2019 | Wilzbach et al. |

FOREIGN PATENT DOCUMENTS

| | | |
|---|---|---|
| JP | 2010-193421 | 9/2010 |
| JP | 2014-531032 | 11/2014 |
| JP | 2016-156801 | 9/2016 |
| JP | 2017-529514 | 10/2017 |
| JP | 2018-533969 | 11/2018 |
| JP | 2019-197031 | 11/2019 |
| JP | 2019-200208 | 11/2019 |
| WO | 2017/037535 | 3/2017 |

OTHER PUBLICATIONS

Jeff W Lichtman et al., "Fluorescence microscopy", Nature Methods, vol. 2, No. 12, Dec. 2005, Nov. 18, 2005, pp. 910-919.

\* cited by examiner (a)

(b)

(c)

IMAGING APPARATUS

BACKGROUND

1. Technical Field

The present disclosure relates to an imaging apparatus.

2. Description of the Related Art

When an object provided with a fluorophore is irradiated with excitation light, fluorescent light is emitted from the fluorophore. Fluorescence imaging for acquiring an image of the fluorescent light is widely used in the biological field and the medical field. With fluorescence imaging, it is possible to visualize an observation target, which has a specific molecule, tissue, or structure, by attaching a fluorophore to the observation target (see, for example, J. W. Lichtman and J. A. Conchello, Fluorescence microscopy, Nat. Methods 2, 910-919 (2005)).

It is possible to investigate an observation target included in an object in more detail by capturing an image of the object by using a hyperspectral camera in fluorescence imaging. U.S. Pat. No. 9,599,511 discloses an imaging apparatus that obtains a hyperspectral image of an object by using a compressed sensing technology.

SUMMARY

One non-limiting and exemplary embodiment provides an imaging apparatus that obtains a hyperspectral image of an object more correctly by using a compressed sensing technology in fluorescence imaging.

In one general aspect, the techniques disclosed here feature an imaging apparatus including: at least one light source that emits excitation light for irradiating an object including at least one light emitter; a coding filter array including filters whose transmission spectra differ from each other; an image sensor that captures an image of object light, which is generated by irradiating the object with the excitation light, through the coding filter array and generates compressed image data; and a processing circuit that generates hyperspectral image data based on the compressed image data. The object light includes emission light, which is produced by the at least one light emitter by absorbing the excitation light, and reflection light of the excitation light reflected by the object. The filters include two filters whose transmission spectra differ from each other. A spectrum of the excitation light overlaps a transmission region in the transmission spectrum of each of the two filters.

It should be noted that general or specific aspects of the present disclosure may be implemented as a system, an apparatus, a method, an integrated circuit, a computer program, or a computer-readable recording medium, or any combination of a system, an apparatus, a method, an integrated circuit, a computer program, and a recording medium. Examples of a computer-readable recording medium include a non-volatile recording medium such as a compact disc read-only memory (CD-ROM). An apparatus may include one or more apparatuses. When an apparatus includes two or more apparatuses, the two or more apparatuses may be disposed in one unit or may be disposed separately in two or more units. In the present specification and the claims, the term "apparatus" may mean not only one apparatus but also a system composed of multiple apparatuses. The apparatuses included in a "system" may include an apparatus that is disposed remote from the other apparatuses and connected to the other apparatuses via a communication network.

With the technology according to the present disclosure, it is possible to provide an imaging apparatus that obtains a hyperspectral image of an object more correctly by using a compressed sensing technology in fluorescence imaging.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1A:
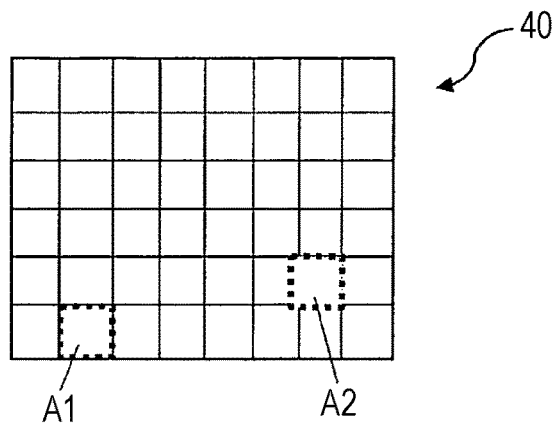
FIG. 1A schematically illustrates an example of a filter array.

In the present disclosure, all or a part of a circuit, a unit, an apparatus, a member, or a portion, or all or some of the functional blocks of a block diagram may be performed by, for example, one or more electronic circuits including a semiconductor device, a semiconductor integrated circuit (IC), or a large scale integration (LSI). An LSI or an IC may be integrated in one chip, or may be a combination of two or more chips. For example, functional blocks other than a memory device may be integrated in one chip. Devices that are called an LSI or IC here, whose name changes in accordance with the degree of integration, may be those that are called a system LSI, a very large scale integration (VLSI), or an ultra large scale integration (ULSI). A field programmable gate array (FPGA), which is an LSI that is programmed after having been manufactured, or a reconfigurable logic device, which is an LSI that allows reconfiguration of internal connection relationship or setting up of internal circuit segments, may be used for the same purpose.

Moreover, all or some of the functions or operations of a circuit, a unit, an apparatus, a member, or a portion may be executed by software processing. In this case, software is stored in one or more non-volatile storage media such as a ROM, an optical disk, and a hard disk drive, and, when the software is executed by a processor, a function specified by the software is executed by the processor and a peripheral device. A system or an apparatus may include one or more non-volatile storage media in which software is stored, a processor, and a necessary hardware device such as an interface.

Hereafter, exemplary embodiments according to the present disclosure will be described. Embodiments described below each give a general or specific example. Numerical values, shapes, elements, the dispositions of the elements, the connections between the elements, steps, and the order of the steps described in the following embodiments are examples, and are not intended to limit the present disclosure. Elements of the following embodiments that are not described in the independent claims, which show the broadest concepts, are described as optional elements. Each of the figures is a schematic view, and is not necessarily drawn strictly. Moreover, in the figures, substantially the same elements are denoted by the same numerals, and redundant descriptions of such elements may be omitted or simplified.

Before describing the embodiments of the present disclosure, underlying knowledge forming basis of the present disclosure will be described.

When an object including a fluorophore is irradiated with excitation light, fluorescent light emitted by the fluorophore by absorbing a part of the excitation light and reflection light of the excitation light reflected by the object are generated. In existing imaging apparatuses used for fluorescence imaging, the number of wavelength bands with which fluorescent-light images are obtained is about three, like RGB. In this case, the spectrum of the fluorescent light and the spectrum of the excitation light often exist in the same wavelength band, and it is not easy to distinguish an image of the fluorescent light and an image of the reflection light from an image of light in which the fluorescent light and the reflection light of the excitation light are superimposed. Therefore, existing imaging apparatuses include an optical element, such as a dichroic mirror or a long-pass filter, that blocks excitation light.

When the object includes multiple types of fluorophores, the optical element is changed in accordance with each type of fluorophore. Depending on the use, imaging may be switched from fluorescence imaging to ordinary transmission imaging or reflection imaging. With ordinary transmission imaging or reflection imaging, an image of light in which fluorescent light and reflection light of excitation light are superimposed is acquired. In this case, in order to perform ordinary transmission imaging or reflection imaging, it is necessary to remove the optical element that blocks the excitation light or to change the optical element to a half mirror.

It is also possible to use a hyperspectral imaging apparatus that can obtain a hyperspectral image for fluorescence imaging. A hyperspectral image is image data having information about a larger number of wavelengths than a general RGB image. A hyperspectral image represents an image about each of four or more wavelength bands included in a target wavelength region.

In fluorescence imaging, when the spectrum of fluorescent light has a wavelength region that does not overlap the spectrum of reflection light of excitation light, in a wavelength band included in the wavelength region, it is possible to obtain a fluorescence image without removing the reflection light of the excitation light. Accordingly, it is not necessary to use the optical element that blocks the excitation light, and it is not necessary to change the optical element in accordance with the type of fluorophore.

Examples of a hyperspectral imaging apparatus used for fluorescence imaging include a line-scan hyperspectral camera and a camera with a liquid-crystal tunable filter.

With a line-scan hyperspectral camera, a line-shaped image of reflection light is obtained by irradiating an object with line-shaped light, and the image of the reflection light is split into line-shaped images for respective wavelength bands by using a spectroscopic element such as a grating or a prism. A hyperspectral image of the object is obtained by scanning irradiation positions where the object is irradiated with line-shaped light and successively capturing images of the object. Since it takes time for scanning, it is not easy to capture a video by using the line-scan hyperspectral camera.

With a camera with a liquid-crystal tunable filter, it is possible to change the wavelength band of light that passes through the filter in accordance with a voltage applied to the filter. By applying different voltages to the filter and capturing images of an object multiple times, a hyperspectral image of the object is obtained. A transmission image and a reflection image of white light are used to observe the entirety of the object. With a liquid-crystal tunable filter, it is not easy to realize a state of white transmission.

It is also possible to acquire a hyperspectral image by using a compressed sensing technology disclosed in U.S. Pat. No. 9,599,511. With the compressed sensing technology disclosed in U.S. Pat. No. 9,599,511, light that is reflected by an object through a coding filter array, which is called a coding element, is detected by an image sensor. The filter array includes filters that are arranged two-dimensionally. Each of the filters has a specific transmission spectrum. By capturing an image using such a filter array, a compressed image in which image information items of multiple bands are compressed into one two-dimensional image is obtained. In the compressed image, spectrum information of the object is compressed into one pixel value for each pixel and recorded.

FIG. 1A schematically illustrates an example of a filter array 40. The filter array 40 includes filters that are arranged two-dimensionally. Each filter has a transmission spectrum that is individually set. A transmission spectrum is represented by a function $T(\lambda)$, where $\lambda$ is the wavelength of incident light. The transmission spectrum $T(\lambda)$ can have a value that is greater than or equal to 0 and less than or equal to 1. In the example illustrated in FIG. 1A, the filter array 40 includes 48 rectangular filters that are arranged in 6 rows and 8 columns. This is only an example, and, in practical use, a larger number of filters may be provided. The number of filters included in the filter array 40 may be approximately the same as the number of pixels of an image sensor.

Figure 1B:
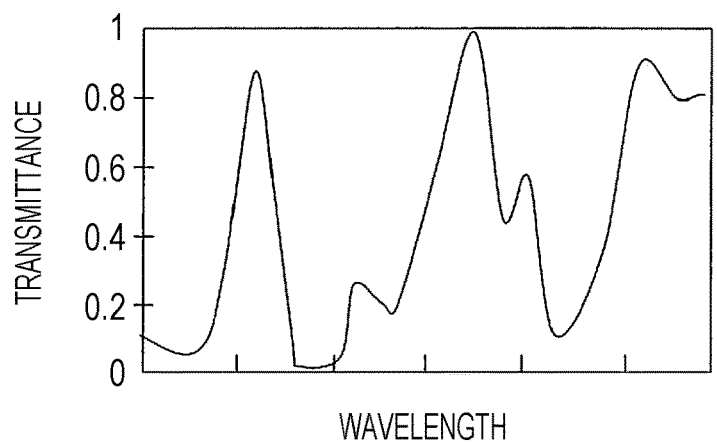
FIG. 1B illustrates an example of the transmission spectrum of a first filter among filters included in the filter array of FIG. 1A.
Figure 1C:
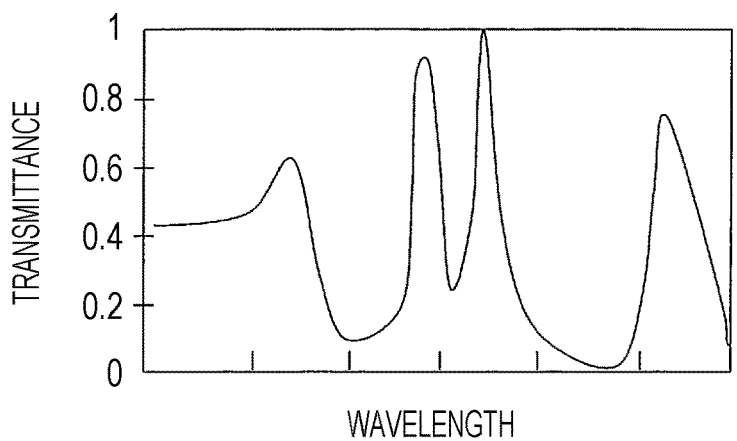
FIG. 1C illustrates an example of the transmission spectrum of a second filter among filters included in the filter array of FIG. 1A.

FIGS. 1B and 1C respectively illustrate an example of the transmission spectra of a first filter A1 and a second filter A2 among the filters included in the filter array 40 of FIG. 1A. The transmission spectrum of the first filter A1 and the transmission spectrum of the second filter A2 differ from each other. In this way, the transmission spectra of the filters of the filter array 40 differ from each other. However, it is not necessary that the transmission spectra of all filters differ. In the filter array 40, the transmission spectra of at least two or more filters among the filters differ from each other. That is, the filter array 40 includes two or more filters whose transmission spectra differ from each other. In an example, the number of patterns of the transmission spectra of the filters included in the filter array 40 may be greater than or equal to the number i of wavelength bands included in a target wavelength region. The filter array 40 may be designed so that the transmission spectra of half or more of the filters differ.

Figure 1D:
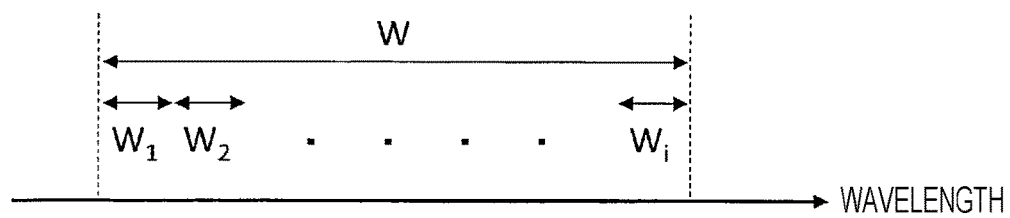
FIG. 1D schematically illustrates the relationship between a target wavelength region and wavelength bands included in the target wavelength region.

FIG. 1D schematically illustrates the relationship between a target wavelength region W and wavelength bands W1, W2, ..., Wi included in the target wavelength region W. The target wavelength region W may be set to any appropriate range depending on the use. The target wavelength region W may be, for example, a visible wavelength region from about 400 nm to about 700 nm, a near-infrared wavelength region from about 700 nm to about 2500 nm, or a near-ultraviolet wavelength region from about 10 nm to about 400 nm. Alternatively, the target wavelength region W may be a mid-infrared wavelength region or a far-infrared wavelength region. In this way, a wavelength region to be used is not limited to a visible wavelength region. In the present specification, in addition to visible light, electromagnetic radiation whose wavelength is not included in the visible wavelength region, such as ultraviolet rays and infrared rays, is also referred to as "light" for convenience.

In the example illustrated in FIG. 1D, the bands W1, W2, ..., Wi are wavelength regions each of which is 1/i of the target wavelength region W, where i is any integer greater than or equal to 4. However, this is not a limitation. The bands included in the target wavelength region W may be set in any appropriate manner. For example, the bands may have unequal widths. There may be a gap between adjacent bands. Provided that the number of bands is four or more, it is possible to obtain a larger amount of information from a hyperspectral image than from an RGB image.

Figure 1E:
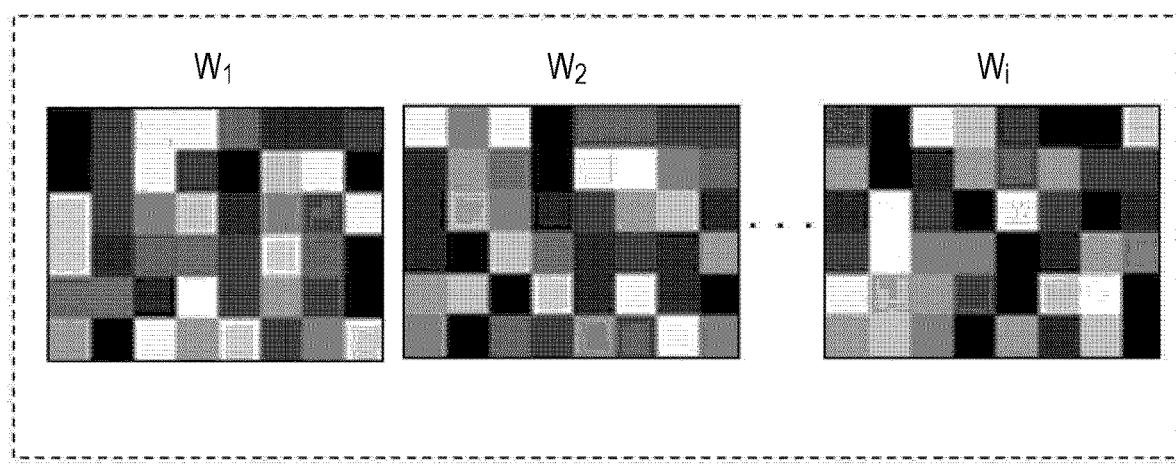
FIG. 1E illustrates examples of the spatial distributions of transmittance of light in the wavelength bands illustrated in FIG. 1D.

FIG. 1E illustrates examples of the spatial distributions of the transmission of light in the wavelength bands W1, W2, ..., Wi illustrated in FIG. 1D. In the examples illustrated in FIG. 1E, the difference in shade between the filters represents the difference in optical transmittance between the filters. A filter with a lighter shade has a higher transmittance, and a filter with a darker shade has a lower transmittance. As illustrated in FIG. 1E, the spatial distribution of optical transmittance differs between the wavelength bands.

Figure 2:
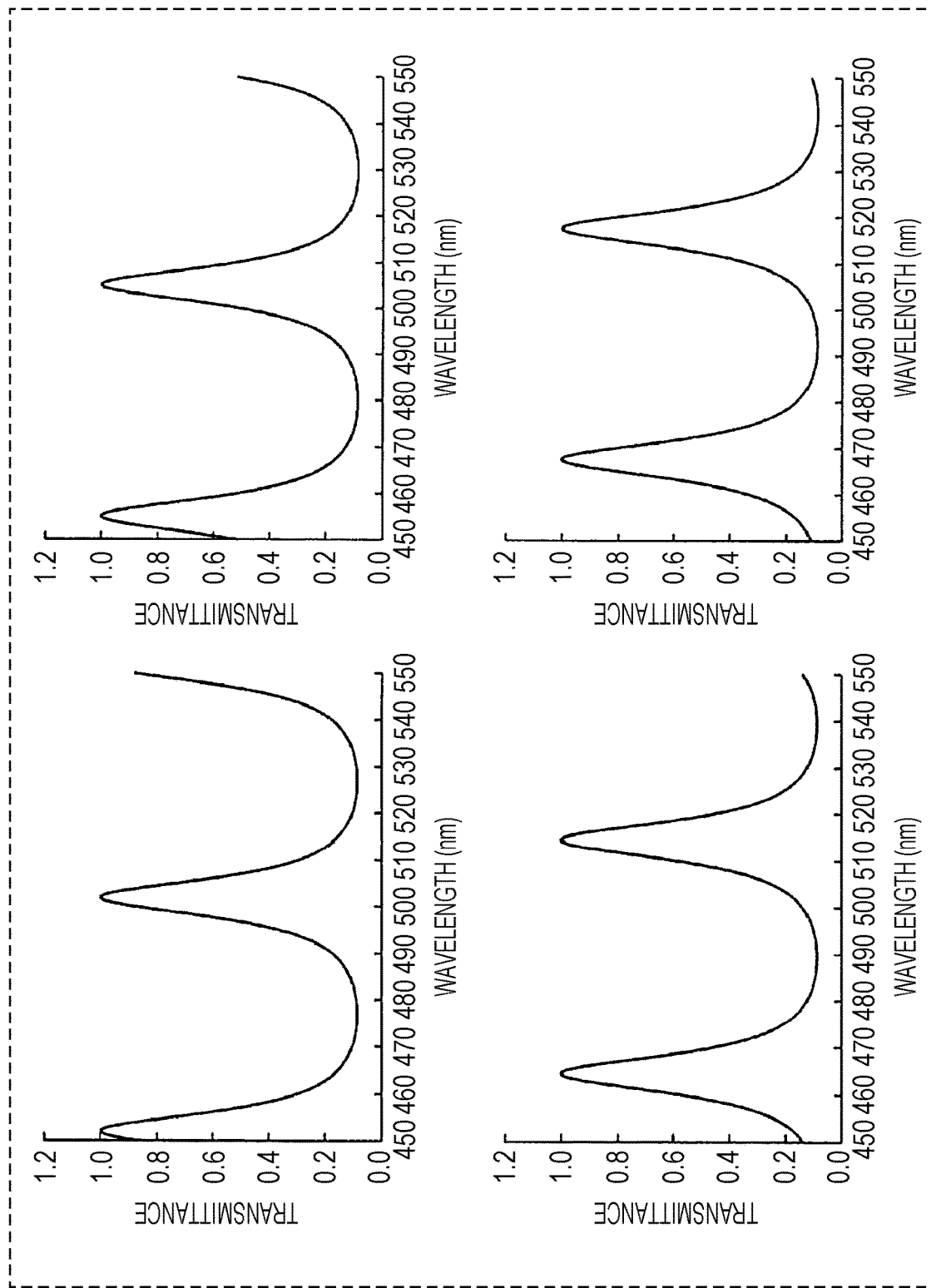
FIG. 2 is a graph illustrating examples of the transmission spectra of four types of filters among sixteen types of filters included in the filter array.

The filter array 40 that is actually used includes, for example, 1 million filters. The 1 million filters include, for example, sixteen types of filters that are two-dimensionally arranged randomly or quasi-randomly. The definitions of random and quasi-random are described in U.S. Pat. No. 9,599,511. FIG. 2 is a graph illustrating examples of the transmission spectra of four types of filters among the sixteen types of filters included in the filter array 40. As illustrated in FIG. 2, the transmission spectrum of each filter has transmission peaks in a target wavelength region of greater than or equal to 450 nm and less than or equal to 550 nm. Regarding adjacent two transmission peaks, the interval between peak wavelengths is about 50 nm. The maximum transmittance at each transmission peak is higher than or equal to 90%, and the half-width of each transmission peak is about 10 nm. The transmission spectra of the sixteen types of filters have a relationship such that the transmission spectra are shifted from each other along the wavelength axis. In the present specification, the term "transmission peak" means a convex shape including a maximal value in a transmission spectrum, and the term "peak wavelength" means a wavelength corresponding to the maximal value included in the convex shape in the spectrum.

A transmission spectrum illustrated in FIG. 2 can be realized, for example, by using a filter including two dielectric multilayer films and a transparent layer positioned therebetween. The dielectric multilayer films have a wavelength region, which is called a stop band, where reflectivity is high. In the filter, a standing wave is formed in the transparent layer positioned between the two dielectric multilayer films, and, as a result, multiple transmission peaks appear in the wavelength region of the stop band. It is possible to shift the transmission peaks along the wavelength axis by changing the thickness and/or the refractive index of the transparent layer.

It is possible to reconstruct a hyperspectral image from a compressed image by using data that represents the spatial distribution of optical transmittance for each wavelength band in the filter array 40. For the reconstruction, a compressed sensing technology is used. The data that is used in reconstruction processing and that represents the spatial distribution of optical transmittance for each wavelength band in a filter array will be referred to as a "reconstruction table". In other words, the reconstruction table is determined based on the spatial distribution of transmission spectra of multiple types of filters included in the filter array 40. With the compressed sensing technology, it is possible to downsize an imaging apparatus because it is not necessary to use an optical device such as a prism or a grating. Moreover, with the compressed sensing technology, it is possible to reduce the amount of data to be processed due to a compressed image.

Next, a method of reconstructing a hyperspectral image from a compressed image by using a reconstruction table will be described. Compressed image data g acquired by an image sensor, a reconstruction table H, and hyperspectral image data f satisfy the following equation (1).

$$g = Hf \quad (1)$$

Here, the compressed image data g and the hyperspectral image data f are vector data, and the reconstruction table H is matrix data. When the number of pixels of the compressed image data g is denoted by Ng, the compressed image data g is represented by a one-dimensional array, that is, a vector having Ng elements. When the number of pixels of the hyperspectral image data f is denoted by Nf and the number of wavelength bands is denoted by M, the hyperspectral image data f is represented as a one-dimensional array, that is, a vector having Nf×M elements. The reconstruction table H is represented as a matrix having Ng columns and (Nf×M) rows. The Ng and Nf may be designed to have the same value.

Given the vector g and the matrix H, it seems possible to compute f by solving the inverse problem of the equation (1). However, since the number of elements Nf×M of the data f to be computed is larger than the number of elements Ng of the acquired data g, this problem is an ill-posed problem, and cannot be solved as it is. Therefore, redundancy of images included in the data f is utilized, and a solution is obtained by using a compressed sensing method. To be specific, the data f to be obtained is estimated by solving the following equation (2).

$$f' = \arg\min_{f}\{\|g - Hf\|_{l_2} + \tau\Phi(f)\} \quad (2)$$

Here, f' represents data of estimated f. In the above equation, the first term in the braces represents the difference between an estimation result Hf and the acquired data g, which is so-called a residual term. Here, the sum of squares is used as the residual term, but the absolute value, the root of the sum of squares, or the like may be used as the residual term. The second term in the braces is a regularization term or a stabilization term described below. The equation (2) means obtaining f that minimizes the sum of the first term and the second term. An arithmetic processing circuit can make a solution to converge by performing recursive operation, and compute a final solution f.

The first term in the braces of the equation (2) means an operation for obtaining the sum of squares of the difference between the acquired data g and Hf that is obtained by system-transforming f in the estimation process by using the matrix H. $\Phi(f)$ in the second term is a constraint on regularization of f, and is a function that reflects sparse information of the estimated data. The second term has an effect of smoothing or stabilizing the estimated data. The regularization term can be represented by, for example, the discrete cosine transform (DCT), the wavelet transform, the Fourier transform, the total variation (TV), or the like of f. For example, when the total variation is used, stable estimated data in which an effect of noise in the observation data g is suppressed can be acquired. The sparseness of an object in the space of each regularization term differs in accordance with the texture of the object. A regularization term such that the texture of the object becomes sparser in the space of the regularization term may be selected. Alternatively, multiple regularization terms may be included in an operation. $\tau$ is a weighting factor. As the weighting factor $\tau$ increases, the reduction amount of redundant data increases, and the compression rate increases. As the weighting factor $\tau$ decreases, convergence to a solution becomes weaker. The weighting factor $\tau$ is set to an appropriate value with which f converges to a certain degree and is not overcompressed.

A more detailed method of obtaining a hyperspectral image by using a compressed sensing technology is disclosed in U.S. Pat. No. 9,599,511. The entirety of the disclosure of U.S. Pat. No. 9,599,511 is incorporated in the present specification.

The inventors have found that the following problem arises when a hyperspectral imaging apparatus using a compressed sensing technology is used for fluorescence imaging.

Typically, a laser light source is used for excitation of fluorescent light. The spectrum width of laser light emitted from the laser light source is about several nanometers. A mercury lamp, instead of a laser light source, is usually used for fluorescence microscopy. The spectrum width of light emitted from the mercury lamp is approximately the same as or narrower than the spectrum width of laser light. In contrast, as illustrated in FIG. 2, in the filter array 40 that is actually used, the half-width of a transmission peak of each filter is about 10 nm, and the transmittance of each filter at a transmission peak is higher than or equal to 90%. When excitation light whose spectrum width is narrow as describe above is used, if the peak wavelength of the excitation light coincides with the peak wavelength of a transmission peak, reflection light of the excitation light generated in fluorescence imaging passes through the filter with high efficiency.

Figure 3:
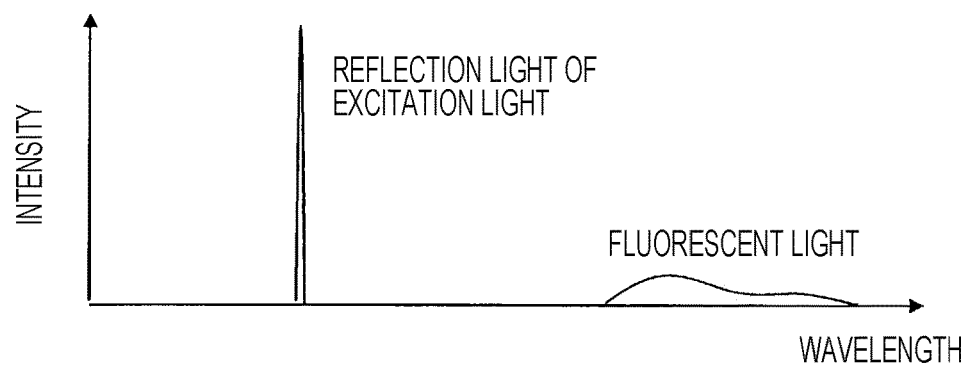
FIG. 3 schematically illustrates (a) the spectra of reflection light of excitation light and fluorescent light that are generated in fluorescence imaging according to existing technology, (b) the transmission spectrum of a filter, and (c) the spectra of the reflection light of the excitation light and the fluorescent light after passing through the filter.
Figure 3:
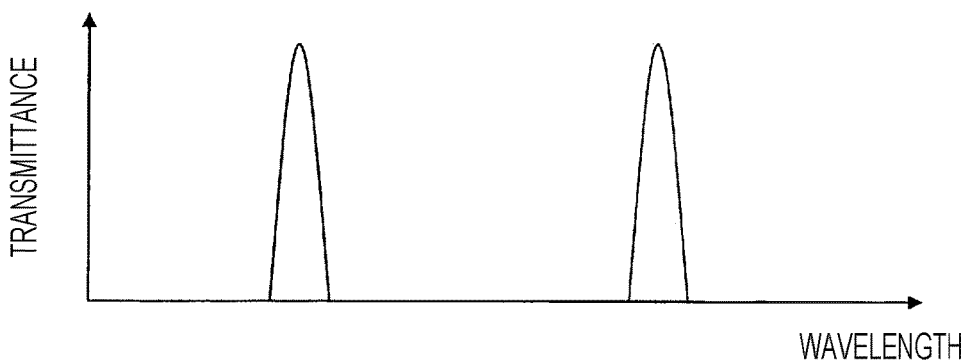
Figure 3:
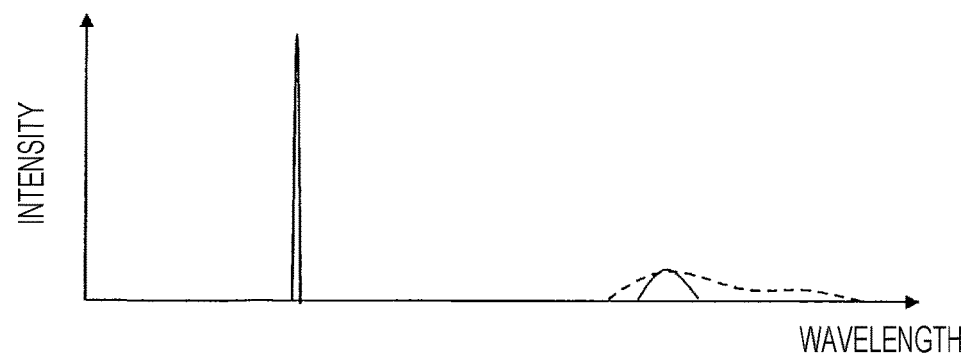

FIG. 3 schematically illustrates (a) the spectra of reflection light of excitation light and fluorescent light that are generated in fluorescence imaging according to existing technology, (b) the transmission spectrum of a filter (referred to as a filter P), and (c) the spectra of the reflection light of the excitation light and the fluorescent light after passing through the filter (that is, the filter P). The spectrum of the reflection light of the excitation light has the same shape as the spectrum of excitation light except for a difference in intensity. As illustrated in (a) of FIG. 3, the reflection light of the excitation light has a relatively high intensity, and the fluorescent light has a relatively low intensity. The spectrum width of the reflection light of the excitation light is relatively narrow, and the spectrum width of the fluorescent light is relatively wide. As illustrated in (b) of FIG. 3, the transmission spectrum of the filter P has two transmission peaks. The peak wavelength of a transmission peak positioned on the low-wavelength side coincides with the peak wavelength of the reflection light of the excitation light. The peak wavelength of a transmission peak positioned on the high-wavelength side coincides with the wavelength of the fluorescent light at the highest intensity. As illustrated in (c) of FIG. 3, the spectrum width of the reflection light of the excitation light scarcely changes before and after passing through the filter P, and the spectrum width of the fluorescent light becomes narrower after passing through the filter P. The broken line illustrated in (c) of FIG. 3 represents the spectrum of the fluorescent light illustrated in (a) of FIG. 3.

The filter array 40 includes multiple types of filters whose transmission spectra differ from each other so that the filter array 40 can perform reconstruction of various spectra. When the peak wavelength of excitation light is changed, the transmittance of reflection light of the excitation light through a filter decreases for some of the filters but increases for the other filters. That is, even when the peak wavelength of the excitation light is changed, the reflection light of the excitation light passes through at least some of the filters with high efficiency.

As illustrated in (a) of FIG. 3, fluorescent light intensity is lower than excitation light intensity. It seems possible to obtain sufficiently high fluorescent light intensity in hyperspectral imaging by increasing excitation light intensity. However, if excitation light intensity is increased to such a level that sufficiently high fluorescent light intensity can be obtained, the reflection light of the excitation light passes through a filter with high efficiency, and saturation of luminance usually occurs in a pixel corresponding to the filter. When luminance saturates, information necessary for the reconstruction operation becomes deficient, and it is likely that a hyperspectral image cannot be obtained correctly. It might be possible to reduce excitation light intensity to such a level that luminance does not saturate. In this case, however, sufficiently high fluorescent light intensity cannot be obtained, and it is likely that the signal-to-noise ratio of a fluorescence image decreases.

Based on the examination described above, the inventors have conceived an imaging apparatus that can generate a hyperspectral image more correctly by using a compressed sensing technology in fluorescence imaging. In an imaging apparatus according to an embodiment of the present disclosure, a filter array includes at least two filters whose transmission spectra differ from each other, and the spectrum of excitation light overlaps the transmission region of the transmission spectra of the at least two filters. Transmission components of the reflection light of the excitation light that pass through the filter array are distributed to the at least two filters. As a result, saturation of luminance can be suppressed in a pixel corresponding to each filter, and it is possible to generate a hyperspectral image more correctly. Hereafter, the imaging apparatus according to the embodiment of the present disclosure will be described briefly.

An imaging apparatus according to a first item includes: at least one light source that emits excitation light for irradiating an object including at least one light emitter; a coding filter array including filters whose transmission spectra differ from each other; an image sensor that captures an image of object light, which is generated by irradiating the object with the excitation light, through the coding filter array and generates compressed image data; and a processing circuit that generates hyperspectral image data based on the compressed image data. The object light includes emission light, which is produced by the at least one light emitter by absorbing the excitation light, and reflection light of the excitation light reflected by the object. The filters include two filters whose transmission spectra differ from each other, A spectrum of the excitation light overlaps a transmission region in the transmission spectrum of each of the two filters.

With the imaging apparatus, saturation of luminance can be suppressed in a pixel corresponding to each filter, and it is possible to generate a hyperspectral image more correctly.

An imaging apparatus according to a second item is the imaging apparatus according to the first item, in which the two filters include a first filter. A wavelength region having an intensity that is higher than or equal to a half of a highest intensity in the spectrum of the excitation light includes a wavelength region having an intensity that is higher than or equal to a half of a highest intensity in a first transmission peak in a transmission spectrum of the first filter.

With the imaging apparatus, it is possible to cause the spectrum of the excitation light to overlap the transmission regions in the transmission spectra of the two filters.

An imaging apparatus according to a third item is the imaging apparatus according to the first item, in which the two filters include a first filter, and a half-width of the spectrum of the excitation light is wider than a half-width of a first transmission peak of a transmission spectrum the first filter.

With the imaging apparatus, it is possible to cause the spectrum of the excitation light to overlap the transmission regions in the transmission spectra of the two filters. An imaging apparatus according to a fourth item is the imaging apparatus according to the first item, in which the two filter are a first filter and a second filter, and the spectrum of the excitation light overlaps a first transmission peak in a transmission spectrum of the first filter and a second transmission peak in a transmission spectrum of the second filter.

With the imaging apparatus, it is possible to cause the spectrum of the excitation light to overlap the transmission regions in the transmission spectra of the two filters.

An imaging apparatus according to a fifth item is the imaging apparatus according to any one of the first to fourth items, in which the spectrum of the excitation light has a wavelength region that overlaps an absorption spectrum of the at least one light emitter, and an emission spectrum of the at least one light emitter has a wavelength region that does not overlap a spectrum of the reflection light of the excitation light.

With the imaging apparatus, it is possible to excite the light emitter with the excitation light, and it is possible to obtain object light that includes emission light and does not include the reflection light of the excitation light in a wavelength region in which the emission spectrum of the light emitter does not overlap the spectrum of the reflection light of the excitation light.

An imaging apparatus according to a sixth item is the imaging apparatus according to any one of the first to fifth items, in which the light source includes an LED or a superluminescent diode.

With the imaging apparatus, it is possible to emit excitation light whose spectrum is broad from the light source.

An imaging apparatus according to a seventh item is the imaging apparatus according to any one of the first to sixth items, in which the at least one light source includes a first light source that emits first excitation light and a second light source that emits second excitation light. A spectrum of the first excitation light and a spectrum of the second excitation light differ from each other. The processing circuit switches between an operation of causing the first light source to emit the first excitation light and an operation of causing the second light source to emit the second excitation light.

With the imaging apparatus, it is possible to irradiate an object with the first excitation light or the second excitation light in accordance with use.

An imaging apparatus according to an eighth item is the imaging apparatus according to the seventh item, in which the at least one light emitter includes a first light emitter and a second light emitter. A first absorption spectrum of the first light emitter and a second absorption spectrum of the second light emitter differ from each other. The first excitation light is light that is capable of exciting the first light emitter. The second excitation light is light that is capable of exciting the second light emitter.

With the imaging apparatus, it is possible to emit excitation light suitable for each of the first light emitter and the second light emitter included in the object.

An imaging apparatus according to a ninth item is the imaging apparatus according to the seventh item, in which the first excitation light is white light, and the second excitation light is light that is capable of exciting the at least one light emitter.

With the imaging apparatus, it is possible to use the first excitation light for observation of a transmission image and/or a reflection image and to use the second excitation light for observation of a fluorescence image.

First Embodiment

Figure 4:
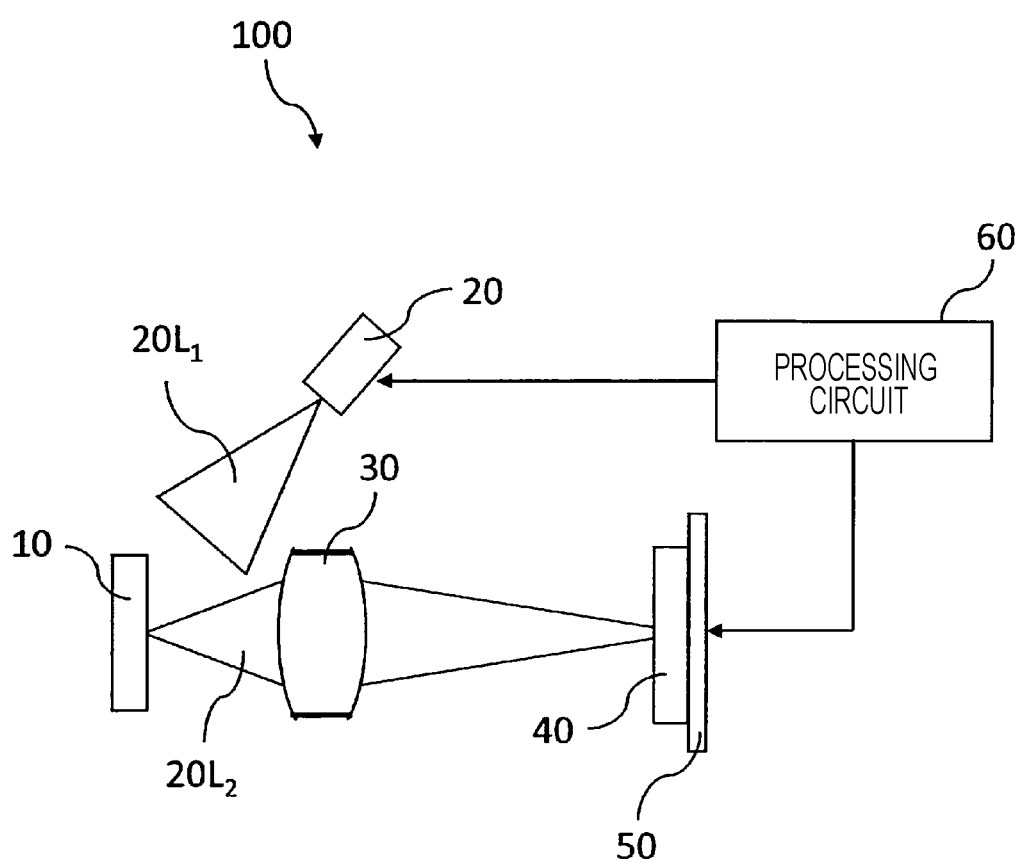
FIG. 4 schematically illustrates the configuration of an imaging apparatus according to an exemplary first embodiment of the present disclosure.

Hereafter, referring to FIG. 4, an example of the configuration of an imaging apparatus according to a first embodiment of the present disclosure will be described. FIG. 4 schematically illustrates the configuration of an imaging apparatus 100 according to an exemplary first embodiment of the present disclosure. In FIG. 4, an object 10 including one or more types of fluorophores that differ from each other are illustrated. The number of types of fluorophores may be one. In the present specification, a substance that generates emission light by absorbing excitation light will be referred to as a "light emitter". When the light emitter is a fluorophore, the emission light is fluorescent light. The light emitter need not be a fluorophore, and may be a phosphorescent dye or a quantum dot. The imaging apparatus 100 illustrated in FIG. 4 includes a light source 20, an optical system 30, the filter array 40, an image sensor 50, and a processing circuit 60 that controls the light source 20 and the image sensor 50.

The light source 20 emits excitation light 20L1 with which the object 10 is to be irradiated. Object light 20L2 is generated by irradiating the object 10 with the excitation light 20L1. The object light 20L2 includes fluorescent light, which is emitted as the fluorophore absorbs a part of the excitation light 20L1, and reflection light of the excitation light 20L1 reflected by the object 10.

When the spectrum of the excitation light 20L1 has a wavelength region that overlaps the absorption spectrum of the fluorophore, the excitation light 20L1 can excite the fluorophore. The clause "the spectrum of X has a wavelength region that overlaps the spectrum of Y" means that the wavelength region of the spectrum of X includes at least a part of the wavelength region of the spectrum of Y. In the present specification, the phrase "the wavelength region of a spectrum" means a wavelength region in which the spectrum has an intensity that is higher than or equal to $1/10$ of the highest intensity. The term "spectrum width" means the width of the wavelength region. However, in the following description, depending on the circumstances, the half-width of a spectrum may be used instead of the spectrum width.

The clause "the spectrum of excitation light overlaps a transmission region in the transmission spectrum of a filter" may mean that "the wavelength region of the spectrum of excitation light exhibiting a strength that is higher than or equal to $1/10$ of the highest intensity overlaps a wavelength region of the transmission spectrum of the filter having a transmittance that is higher than or equal to $1/10$ of the highest transmittance".

When a fluorescence spectrum has a wavelength region that does not overlap the spectrum of the reflection light of the excitation light 20L1, in the wavelength region, it is possible to obtain a fluorescence image without removing the reflection light of the excitation light 20L1 from the object light 20L2. The clause "the spectrum of X has a wavelength region that does not overlap the spectrum of Y" means that the wavelength region of the spectrum of X has a portion that is not included in the wavelength region of the spectrum of Y.

The optical system 30 includes at least one lens. The optical system 30, which is illustrated as one lens in FIG. 4, may be a combination of lenses. The optical system 30 forms an image of the object light 20L2 on the imaging surface of the image sensor 50 via the filter array 40.

The filter array 40 has been described above with reference to FIGS. 1A to 2. The filter array 40 may be disposed in the vicinity of or directly above the image sensor 50. Here, the term "the vicinity" means that the filter array 40 is close to the image sensor 50 to such a degree that an image of light from the optical system 30 can be formed sharply to some extent on the surface of the filter array 40. The term "directly above" means that the filter array 40 is close to the image sensor 50 to such a degree that a gap is scarcely formed therebetween. The filter array 40 and the image sensor 50 may be integrated with each other.

The image sensor 50 includes two-dimensionally arranged pixels, that is, a pixel array, and generates and outputs compressed image data in accordance with the intensity of light that enters the pixel array. The filters included in the filter array 40 may correspond to the pixels included in the image sensor 50. That is, each of the filters corresponds to one of the pixels. However, the filters need not correspond one-to-one with the pixels.

The processing circuit 60 causes the light source 20 to emit the excitation light 20L1. Based on the compressed image data generated and output by the image sensor 50 and the reconstruction table, the processing circuit 60 generates and outputs hyperspectral image data representing an image about each of wavelength bands. The method of generating the hyperspectral image data has been described above. A computer program to be executed by the processing circuit 60 is stored in a memory (not shown), such as a ROM or a random excess memory (RAM). In this way, the imaging apparatus 100 includes a processor including the processing circuit 60 and the memory. The processing circuit 60 and the memory may be integrated in one circuit board or may be provided in separate circuit boards. The function of the processing circuit 60 may be distributed in multiple circuits. The reconstruction table may be stored in the memory.

Next, referring to FIG. 5, the relationship between the spectrum of the excitation light 20L1 and the average transmittance of the excitation light 20L1 through a filter will be described. The average transmittance T satisfies the following equation.

$$T = (\int I(\lambda) \times t(\lambda) d\lambda) / \int I(\lambda) d\lambda$$

Here, $\lambda$ is a wavelength, $I(\lambda)$ is the spectrum of irradiation excitation light, and $t(\lambda)$ is the spectral transmission spectrum of a filter. $\int$ represents an integral in the total wavelength range, which is substantially a wavelength range in which the intensity of light that passes the filter is not 0.

In practice, the excitation light 20L1 usually has a Gaussian-function-shaped spectrum, and a rectangular spectrum and a Gaussian-function-shaped spectrum are similar to each other in the half-width dependency of average transmittance. Therefore, a rectangular spectrum will be used for description here.

A rectangular excitation light spectrum can be represented by a center wavelength and a half-width. FIG. 5 is a graph illustrating the center wavelength dependence of average transmittance when a filter is irradiated with excitation light having a rectangular spectrum. For example, the value at 510 nanometers along the horizontal axis when the half-width is 5.2 nm is a transmittance when the filter is irradiated with light having an intensity distribution in the range of wavelength from 507.4 nm to 512.6 nm. Likewise, the value at 515 nanometers along the horizontal axis when the half-width is 5.2 nm is a transmittance when the filter is irradiated with light having an intensity distribution in the range of wavelength from 512.4 nm to 517.6 nm. In FIG. 5, "RAW" represents average transmittance when the filter is irradiated with excitation light having a spectrum whose half-width is approximately 0, "5.2 nm" represents average transmittance when the filter is irradiated with excitation light having a spectrum whose half-width is 5.2 nm, "9.6 nm" represents average transmittance when the filter is irradiated with excitation light having a spectrum whose half-width is 9.6 nm, "18.4 nm" represents average transmittance when the filter is irradiated with excitation light having a spectrum whose half-width is 18.4 nm, "27.3 nm" represents average transmittance when the filter is irradiated with excitation light having a spectrum whose half-width is 27.3 nm, and "36.1 nm" represents average transmittance when the filter is irradiated with excitation light having a spectrum whose half-width is 36.1 nm.

Figure 5:
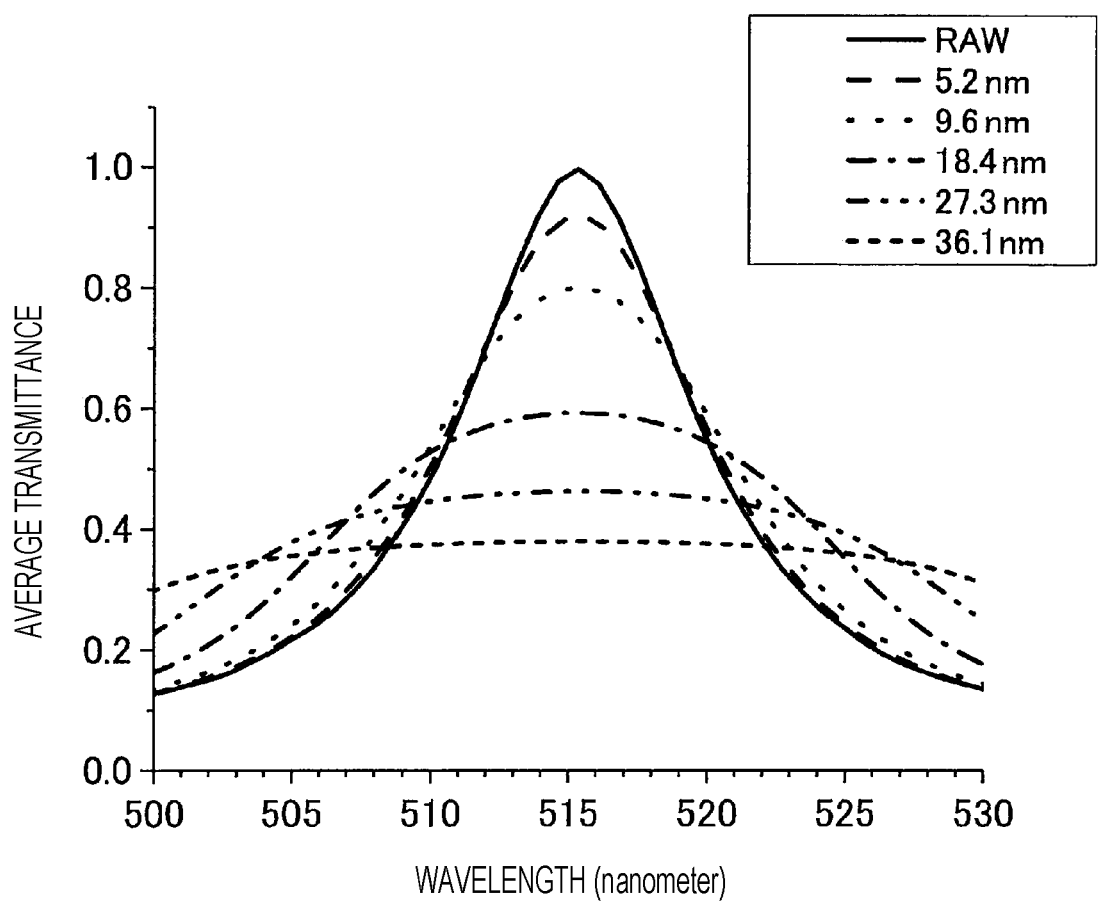
FIG. 5 is a graph illustrating the center wavelength dependence of average transmittance when a filter is irradiated with excitation light having a rectangular spectrum.

As illustrated in FIG. 5, when the half-width of the spectrum of the excitation light 20L1 is RAW (approximately 0 nm), a peak representing the relationship between the center wavelength of the excitation light 20L1 and the average transmittance coincides with the transmission peak of the filter. As the half-width of the excitation light 20L1 increases, the peak illustrated in FIG. 5 becomes broader, and the highest average transmittance decreases. When the half-width of the spectrum of the excitation light 20L1 is narrower than or approximately the same as the half-width of the transmission peak of the filter, that is, RAW (approximately 0 nm), 5.2 nm, and 9.6 nm, the highest average transmittance is higher than or equal to 80%. In contrast, when the half-width of the spectrum of the excitation light 20L1 is wider than the half-width of the transmission peak of the filter, that is, 18.4 nm, 27.3 nm, and 36.1 nm, the highest average transmittance is lower than 80%, which is significantly lower. For example, when the half-width of the spectrum of the excitation light 20L1 is approximately twice the half-width of the transmission peak of the filter, that is, 18.4 nm, the highest average transmittance is lower than or equal to 60%. When the half-width of the spectrum of the excitation light 20L1 is approximately triple the half-width of the transmission peak of the filter, that is, 27.3 nm, the highest average transmittance is lower than or equal to 50%.

From the above facts, the spectrum of the excitation light 20L1 can be selected as follows in the first embodiment. That is, a wavelength region having an intensity that is higher than or equal to a half of a highest intensity in the spectrum of the excitation light 20L1 (referred to as a "first wavelength region") includes a wavelength region having an intensity that is higher than or equal to a half of a highest intensity in a transmission peak of the filter (referred to as a "second wavelength region"). The smallest wavelength value included in the first wavelength region is smaller than the smallest wavelength value included in the second wavelength region, and the largest wavelength value included in the first wavelength region is larger than the largest wavelength value included in the second wavelength region. In this case, the half-width of the spectrum of the excitation light 20L1 is wider than the half-width of the transmission peak of the filter. As a result, as illustrated in FIG. 5, the highest average transmittance decreases, and it is possible to suppress saturation of luminance in a pixel. In the present specification, the clause "the spectrum of the excitation light 20L1 is broad" means that the half-width of the spectrum of the excitation light 20L1 is wider than the half-width of the transmission peak of the filter.

Figure 6:
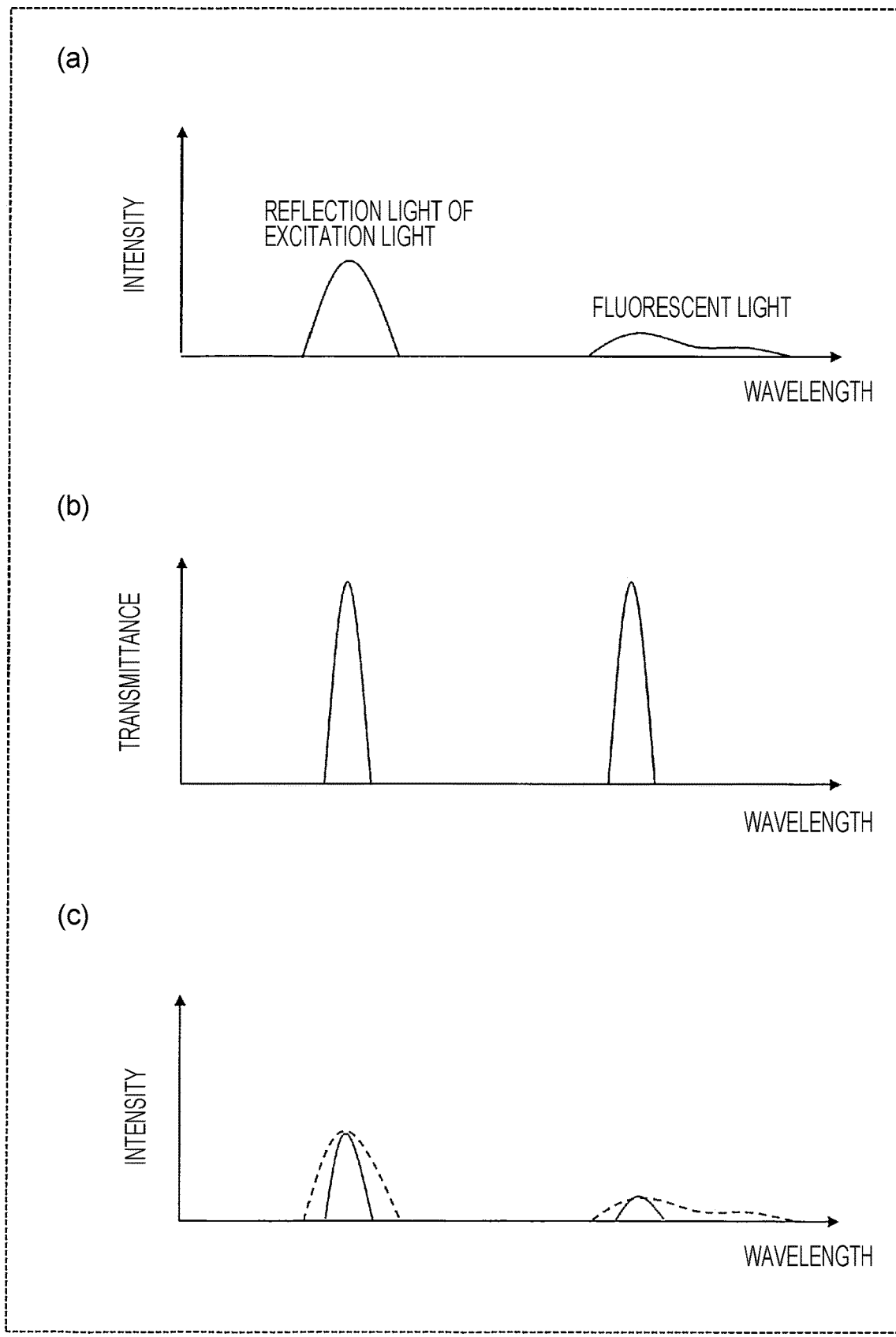
FIG. 6 schematically illustrates (a) the spectra of reflection light of excitation light and fluorescent light that are generated in fluorescence imaging according to the first embodiment, (b) the transmission spectrum of a filter, and (c) the spectra of the reflection light of the excitation light and the fluorescent light after passing through the filter.

FIG. 6 schematically illustrates (a) the spectra of reflection light of the excitation light 20L1 and fluorescent light that are generated in fluorescence imaging according to the first embodiment, (b) the transmission spectrum of a filter (referred to as a filter Q), and (c) the spectra of the reflection light of the excitation light 20L1 and the fluorescent light after passing through the filter (that is, the filter Q). In the spectrum of the reflection light of the excitation light 20L1 illustrated in (a) of FIG. 6, the spectrum width is wider and the highest intensity of the spectrum is lower than those of the spectrum of the reflection light of the excitation light illustrated in (a) of FIG. 3. In contrast, regarding the spectrum of the fluorescent light illustrated in (a) of FIG. 6, the spectrum width and the highest intensity of the spectrum are approximately the same as those of the spectrum of the fluorescent light illustrated in (a) of FIG. 3. The transmission spectrum of the filter Q illustrated in (b) of FIG. 6 is the same as the transmission spectrum of the filter P illustrated in (b) of FIG. 3. Regarding the spectrum of the reflection light of the excitation light 20L1 illustrated in (c) of FIG. 6, the spectrum width is wider and the highest intensity of the spectrum is lower than those of the spectrum of reflection light of excitation light illustrated in (c) of FIG. 3. In contrast, the spectrum of the fluorescent light illustrated in (c) of FIG. 6 is approximately the same as the spectrum of the fluorescent light illustrated in (c) of FIG. 3. The broken lines in (c) of FIG. 6 represent the spectra of the reflection light of the excitation light 20L1 and the fluorescent light illustrated in (a) of FIG. 6.

Figure 7:
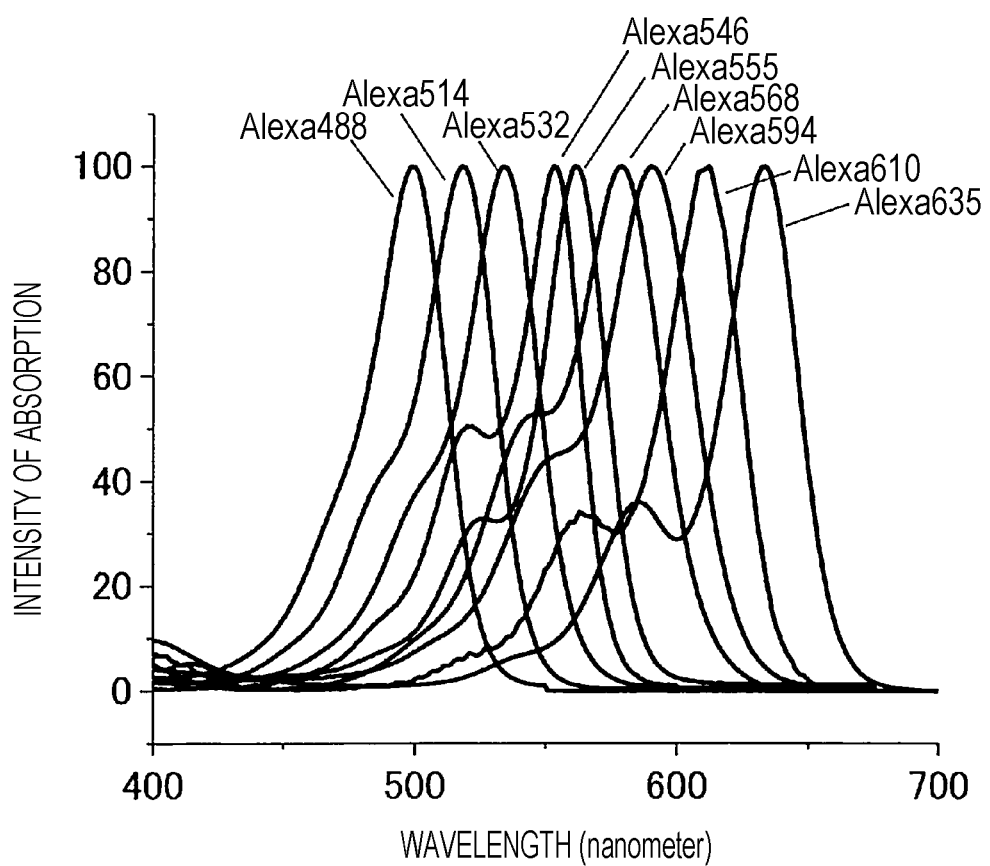
FIG. 7 is a graph illustrating examples of the absorption spectra of nine types of general fluorophores.

FIG. 7 is a graph illustrating examples of the absorption spectra of nine types of general fluorophores. As illustrated in FIG. 7, the half-width of the absorption spectrum of each fluorophore is greater than or equal to 30 nm and less than or equal to 50 nm. When the half-width of the spectrum of the excitation light 20L1 is wider than the half-width of the absorption spectrum of a fluorophore, it is possible to excite the fluorophore by the excitation light 20L1 with high efficiency. The half-width of the absorption spectrum of each fluorophore is wider than the half-width of the transmission peak of the filter. Accordingly, when the half-width of the spectrum of the excitation light 20L1 is selected to be wider than the half-width of the absorption spectrum of a fluorophore, the half-width of the spectrum of the excitation light 20L1 is necessarily wider than the half-width of the transmission peak of the filter. As a result, it is possible to excite the fluorophore with high efficiency, and it is possible to reduce the average transmittance of reflection light of excitation light after passing through the filter. By exciting the fluorophore with high efficiency, it is possible to obtain high fluorescent light intensity. By reducing the average transmittance of the reflection light of the excitation light, it is possible to suppress saturation of luminance in a pixel. Consequently, it is possible to generate a hyperspectral image more correctly.

Fluorescent light intensity depends strongly on the number of photons excited in a fluorophore, and does not depend so much on the wavelength of the excited photons. Therefore, it is possible to obtain high fluorescent light intensity also by increasing the half-width of the spectrum of the excitation light 20L1 and reducing the intensity of the excitation light 20L1 per unit wavelength. This property is also effective in reducing the average transmittance of the excitation light 20L1 through the filter.

The above description is based on a viewpoint such that the spectrum of the transmission peak of one filter included in the filter array 40 is compared with the spectrum of the excitation light 20L1. It is also possible to describe the imaging apparatus 100 according to the first embodiment from another viewpoint. In order to realize hyperspectral imaging, the filter array 40 includes multiple types of filters whose transmission spectra differ from each other. In any of wavelength bands, at least one type of filter has a transmittance higher than or equal to a certain level so that an image about each of the wavelength bands can be obtained.

If the half-width of the spectrum of the excitation light 20L1 is wider than the half-width of the transmission peak of one filter included in the filter array 40, necessarily, transmission components of the reflection light of the excitation light 20L1 that pass through the filter array 40 do not concentrate on one filter included in the filter array 40 but are distributed also to other filters included in the filter array 40. As a result, the transmission components of the reflection light of the excitation light 20L1 are distributed to multiple filters, and saturation of luminance in a pixel corresponding to one filter included in the filter array 40 can be suppressed.

Figure 8A:
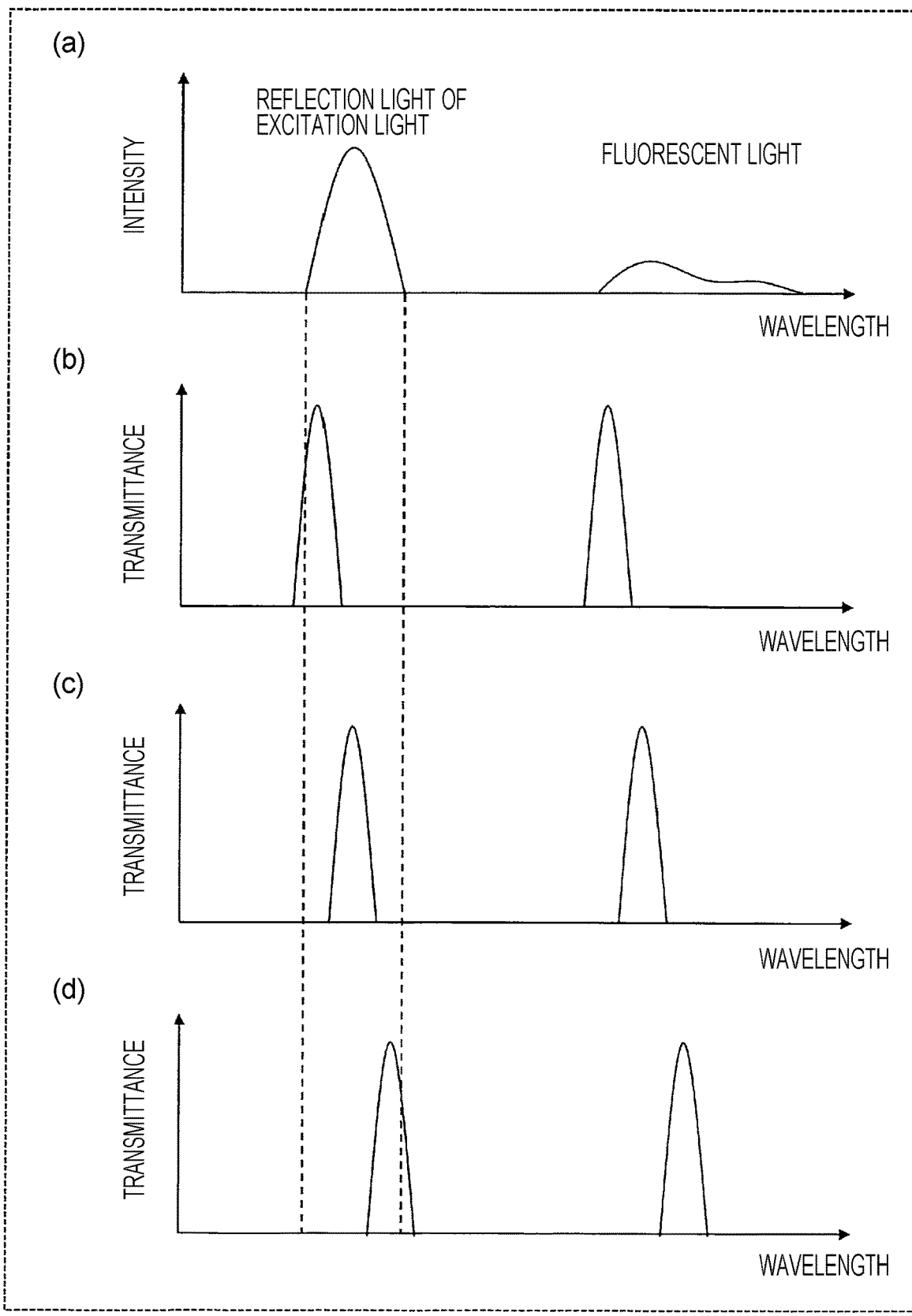
FIG. 8A schematically illustrates (a) the spectra of reflection light of excitation light and fluorescent light that are generated in fluorescence imaging according to the first embodiment, (b) the transmission spectrum of a filter 1, (c) the transmission spectrum of a filter 2, and (d) the transmission spectrum of a filter 3.
Figure 8B:
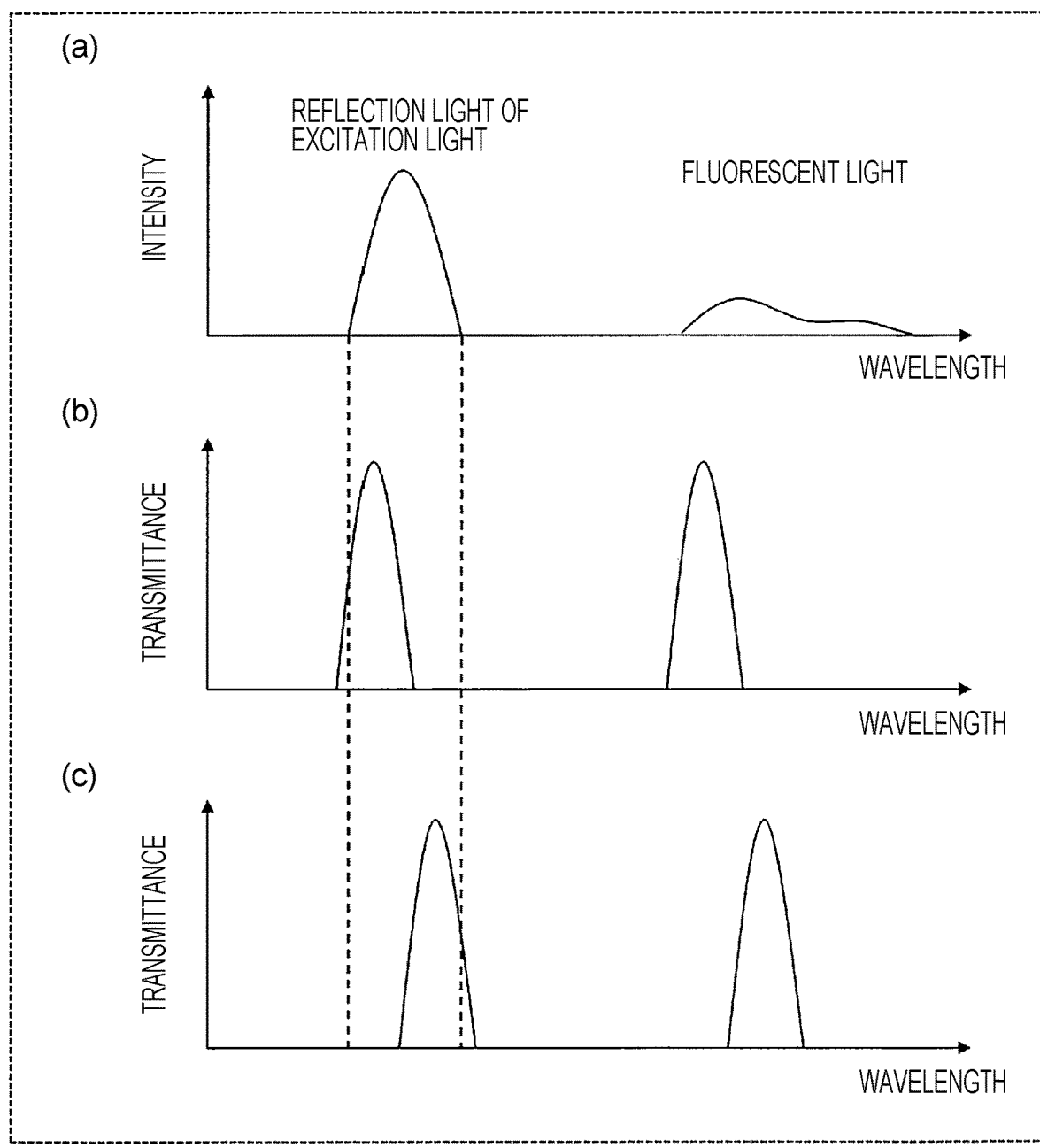
FIG. 8B schematically illustrates (a) the spectra of the reflection light of the excitation light and fluorescent light that are generated in fluorescence imaging according to the first embodiment, (b) the transmission spectrum of a filter 4, and (c) the transmission spectrum of a filter 5.

Referring to FIGS. 8A and 8B, an example in which the reflection light of the excitation light 20L1 is distributed to multiple filters will be described. FIG. 8A schematically illustrates (a) the spectra of reflection light of excitation light and fluorescent light that are generated in fluorescence imaging according to the first embodiment, (b) the transmission spectrum of a filter 1, (c) the transmission spectrum of a filter 2, and (d) the transmission spectrum of a filter 3. A region between the two broken lines in FIG. 8A represents the wavelength region of the spectrum of the reflection light of the excitation light 20L1. The transmission spectrum of each filter has transmission peaks. A transmission peak of the filter 2 overlaps a part of a transmission peak of the filter 1 and a part of a transmission peak of the filter 3. Overlapping of transmission peaks can be defined by the wavelength regions of the transmission peaks. The clause "a transmission peak overlaps a part of another transmission peak" means that the wavelength region of a transmission peak includes a part of the wavelength region of another transmission peak. The phrase "the wavelength region of a transmission peak" means a wavelength region having a transmittance that is higher than or equal to 1/10 of the highest transmittance in the transmission peak.

In the example illustrated in FIG. 8A, the reflection light of the excitation light 20L1 is distributed to the filter 1, the filter 2, and the filter 3. The spectrum of the reflection light of the excitation light 20L1 overlaps a part of a transmission peak of the filter 1, all of a transmission peak of the filter 2, and a part or all of a transmission peak of the filter 3. The clause "the spectrum of X overlaps a part of a transmission peak of a filter" means that the spectrum wavelength region of X includes a part of the wavelength region of the transmission peak of the filter. The clause "the spectrum of X overlaps all of a transmission peak of a filter" means that the spectrum wavelength region of X includes all of the wavelength region of the transmission peak of the filter. The clause "the spectrum of X overlaps a transmission peak of the filter" means that the spectrum of X overlaps a part or all of the transmission peak of the filter.

FIG. 8B schematically illustrates (a) the spectra of reflection light of excitation light and fluorescent light that are generated in fluorescence imaging according to the first embodiment, (b) the transmission spectrum of a filter 4, and (c) the transmission spectrum of a filter 5. A transmission peak of the filter 4 and a transmission peak the filter 5 partially overlap each other. In the example illustrated in FIG. 8B, the reflection light of the excitation light 20L1 is distributed to the filter 4 and the filter 5. The spectrum of the reflection light of the excitation light 20L1 overlaps a part of a transmission peak of the filter 4 and a part of a transmission peak of the filter 5. In this way, the spectrum of the reflection light of the excitation light 20L1 need not overlap all of one transmission peak of one filter included in the filter array 40.

As illustrated in FIGS. 8A and 8B, the spectrum of the reflection light of the excitation light 20L1 overlaps the transmission peaks of at least two filters.

As described above, in the imaging apparatus 100 according to the first embodiment, multiple types of filters in the filter array 40 include at least two filters whose transmission spectra differ from each other, and the spectrum of the excitation light 20L1 overlaps the transmission regions in the transmission spectra of the at least two filters. The phrase "a transmission region in a transmission spectrum" means the wavelength region of a transmission peak of the transmission spectrum. Transmission components of the reflection light of the excitation light 20L1 that pass through the filter array 40 are distributed to the at least two filters. In the reflection light of the excitation light 20L1, the average transmittance of a portion that passes through each filter may be, for example, higher than or equal to 5% and lower than or equal to 60%.

When the object 10 includes multiple types of fluorophores and the spectrum of the reflection light of the excitation light 20L1 overlaps all of the fluorescence spectrum of each type of fluorophore, it is not easy to identify a fluorophore by observing fluorescent light. In the first embodiment, the spectrum of the excitation light 20L1 may be selected appropriately so that the fluorescence spectrum has a wavelength region that does not overlap the spectrum of the reflection light of the excitation light 20L1.

Figure 9A:
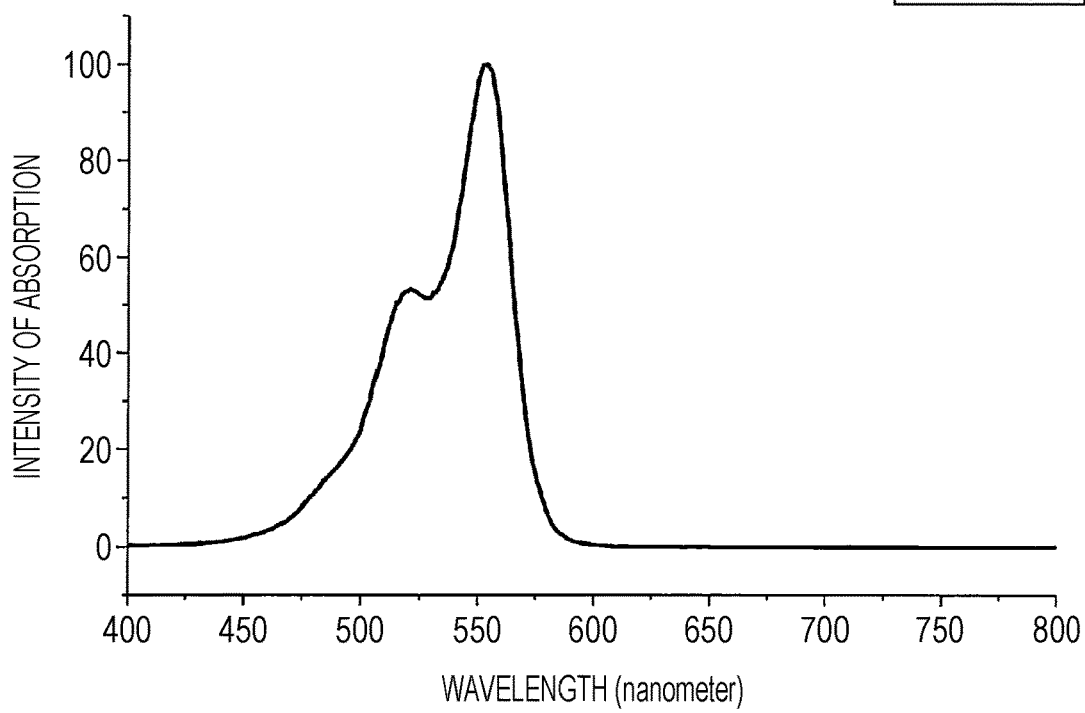
FIG. 9A is a graph illustrating the absorption spectrum of Cy3.
Figure 9B:
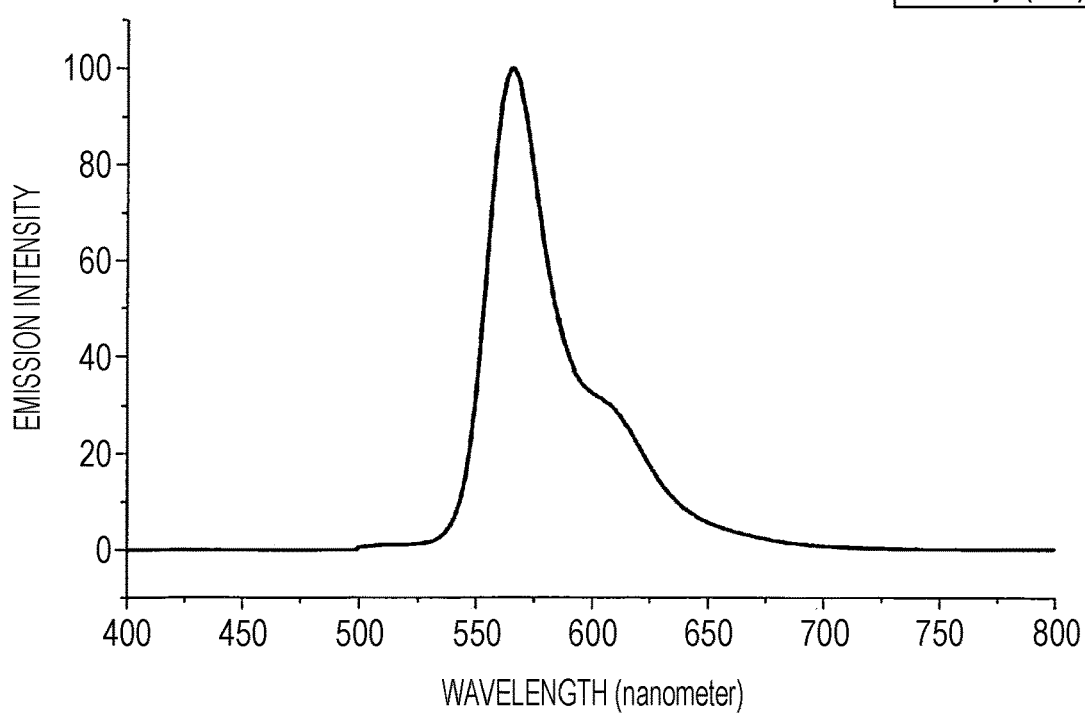
FIG. 9B is a graph illustrating the fluorescence spectrum of Cy3.
Figure 10A:
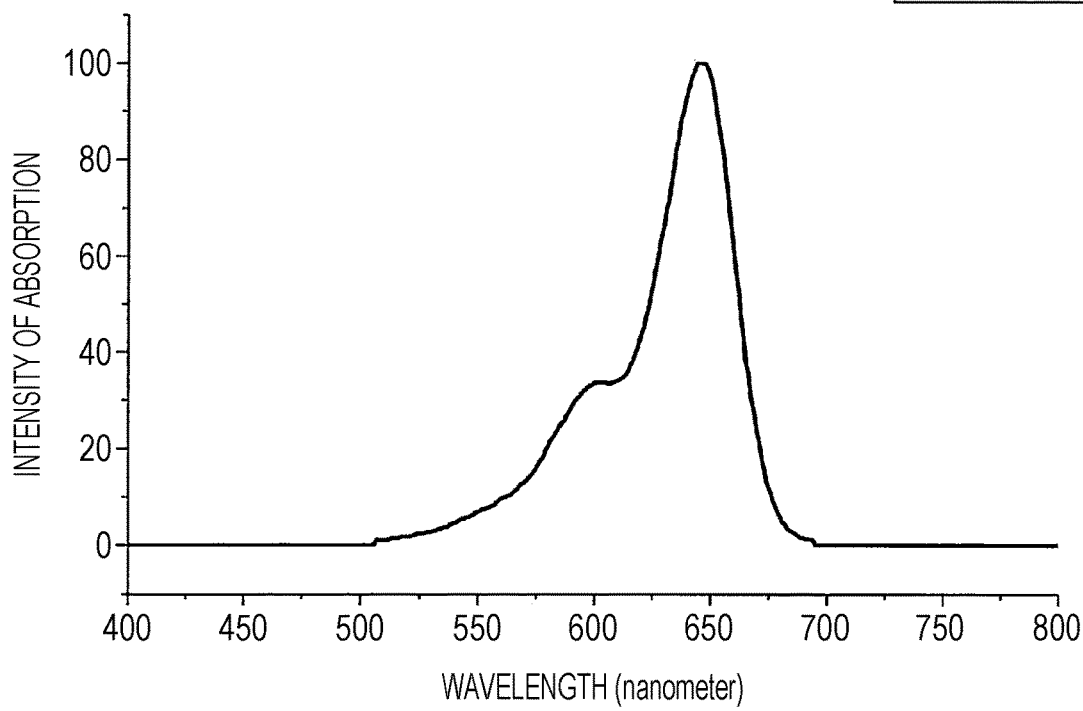
FIG. 10A is a graph illustrating the absorption spectrum of Cy5.
Figure 10B:
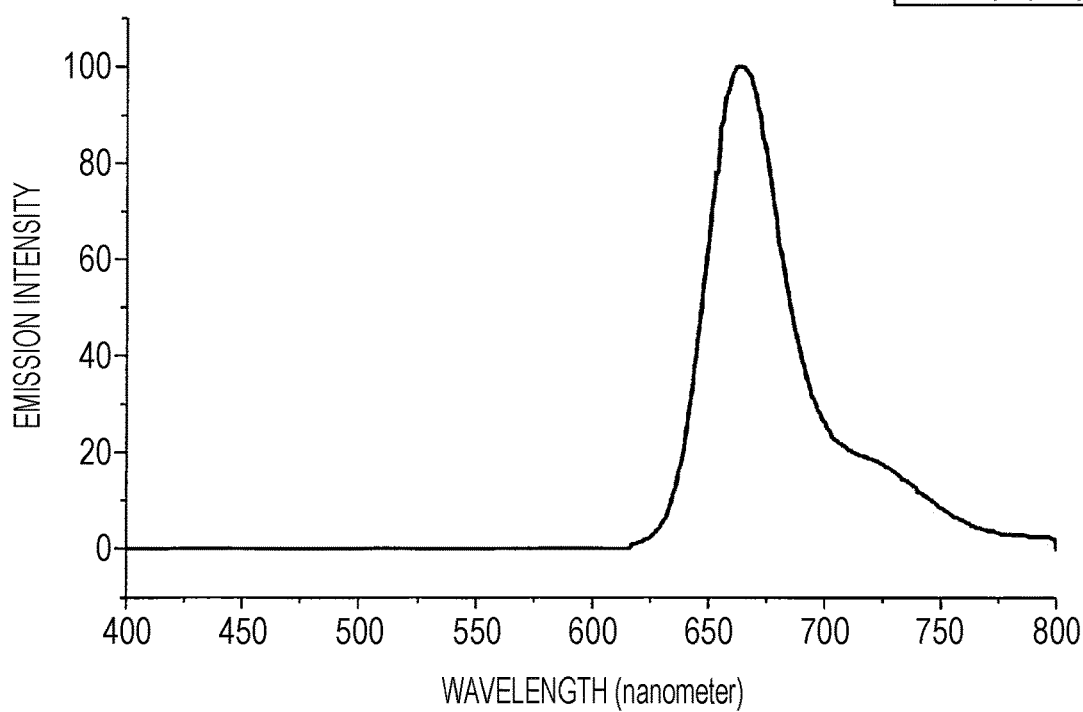
FIG. 10B is a graph illustrating the fluorescence spectrum of Cy5.

Hereafter, referring to FIGS. 9A to 10B, an example in which the object 10 includes Cy3 and Cy5 as fluorophores will be described. FIGS. 9A and 9B are graphs respectively illustrating the absorption spectrum and the fluorescence spectrum of Cy3. FIGS. 10A and 10B are graphs respectively illustrating the absorption spectrum and the fluorescence spectrum of Cy5. As illustrated in FIGS. 9A and 10A, the absorption spectra of Cy3 and Cy5 each have effective absorbance in a wavelength region of greater than or equal to 500 nm and less than or equal to 600 nm. Accordingly, when the wavelength region of the spectrum of the excitation light 20L1 is greater than or equal to 500 nm and less than or equal to 600 nm, the excitation light 20L1 can excite both of Cy3 and Cy5 simultaneously. Here, it is assumed that the wavelength region of the spectrum of the excitation light 20L1 is greater than or equal to 500 nm and less than or equal to 600 nm.

As illustrated in FIG. 9B, the fluorescence spectrum of Cy3 has effective fluorescent light intensity in the wavelength region of greater than or equal to 550 nm and less than or equal to 650 nm. As illustrated in FIGS. 9A and 9B, the fluorescence spectrum does not overlap the absorption spectrum in a wavelength region of greater than or equal to 600 nm and less than or equal to 650 nm. Accordingly, by irradiating the object 10 with the excitation light 20L1, it is possible to obtain the object light 20L2 that includes the fluorescent light but does not include the reflection light of the excitation light 20L1 in the wavelength region of greater than or equal to 600 nm and less than or equal to 650 nm.

Likewise, as illustrated in FIG. 10B, the fluorescence spectrum of Cy5 has effective fluorescent light intensity in a wavelength region of greater than or equal to 625 nm and less than or equal to 750 nm. As illustrated in FIGS. 10A and 10B, the fluorescence spectrum does not overlap the absorption spectrum in a wavelength region of greater than or equal to 700 nm and less than or equal to 750 nm. Accordingly, by irradiating the object 10 with the excitation light 20L1, it is possible to obtain the object light 20L2 that includes the fluorescent light but does not include the reflection light of the excitation light 20L1 in the wavelength region of greater than or equal to 700 nm and less than or equal to 750 nm.

When the excitation light 20L1 is used, it is possible to obtain a fluorescence image of Cy3 in a wavelength band included in the wavelength region of greater than or equal to 600 nm and less than or equal to 625 nm, and it is possible to obtain a fluorescence image of Cy5 in a wavelength band included in the wavelength region of greater than or equal to 625 nm and less than or equal to 750 nm.

The wavelength region of a fluorescence spectrum differs in accordance with the type of fluorophore. Therefore, the light source 20 may be changed in accordance with the type of fluorophore.

Next, the configuration of the light source 20 used in the first embodiment will be described. As described above, the spectrum of the excitation light 20L1 has high intensity in a specific wavelength region, and the half-width thereof may be, for example, greater than or equal to 20 nm and less than or equal to 50 nm. The light source 20 that emits such excitation light 20L1 may include, for example, an LED or a superluminescent diode. Alternatively, the light source 20 may include a white light source that emits white light and an optical element that blocks a part of the spectrum of the white light. The white light source may be, for example, a halogen lamp, and the optical element may be, for example, a band-pass filter or a dichroic mirror. The optical element blocks at least a part of a component of the spectrum of white light in a wavelength region that overlaps the spectrum of fluorescent light.

As described above, with the imaging apparatus 100 according to the first embodiment, it is possible to obtain high fluorescent light intensity, and it is possible to suppress saturation of luminance in a pixel, and, as a result, it is possible to generate a hyperspectral image more correctly in fluorescence imaging.

Second Embodiment

Figure 11:
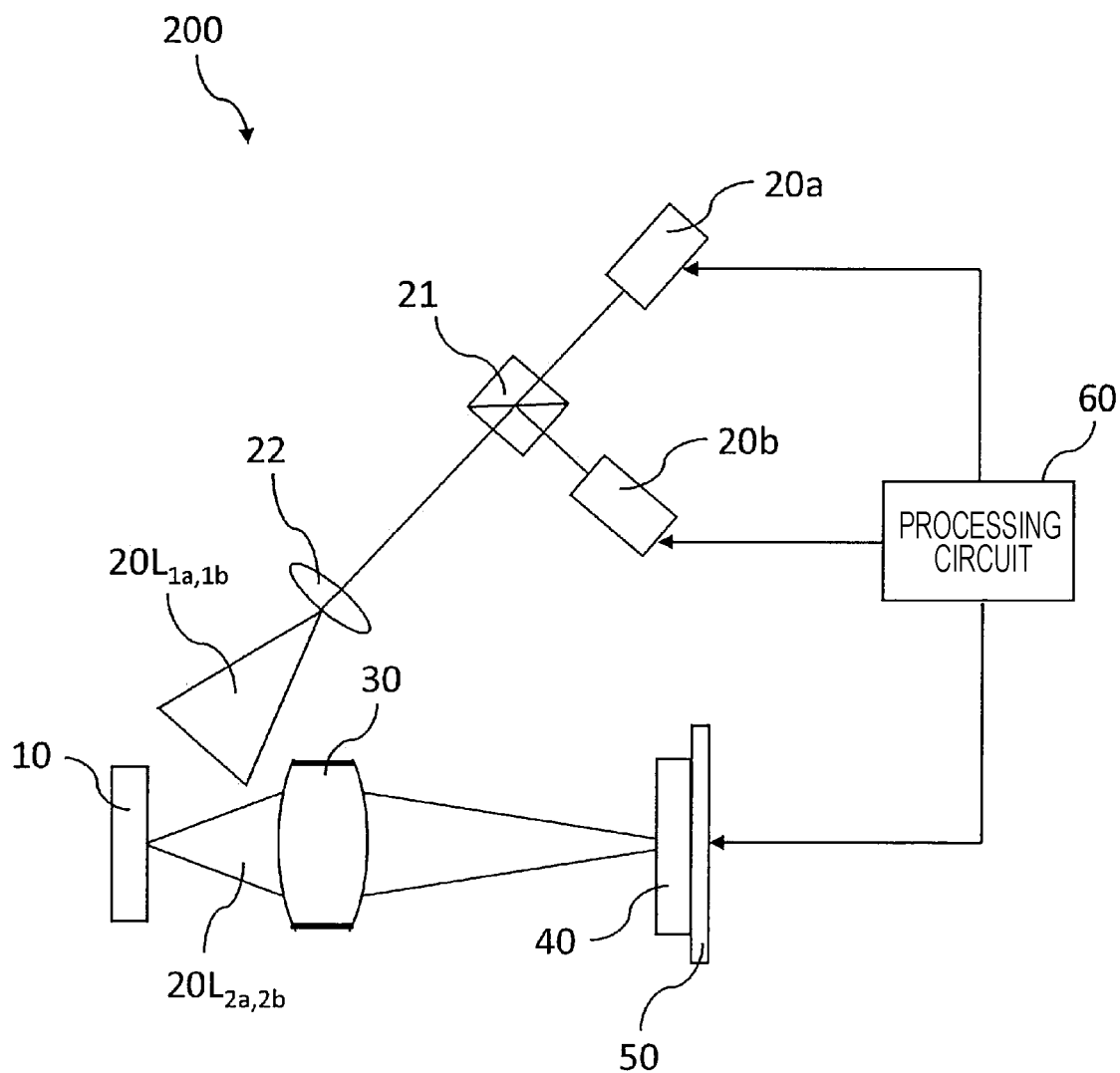
FIG. 11 schematically illustrates the configuration of an imaging apparatus according to an exemplary second embodiment of the present disclosure.

Hereafter, referring to FIG. 11, the configuration of an imaging apparatus 200 according to a second embodiment of the present disclosure will be described with an emphasis on differences from the imaging apparatus 100 according to the first embodiment. FIG. 11 schematically illustrates the configuration of the imaging apparatus 200 according to an exemplary second embodiment of the present disclosure. In FIG. 11, the object 10 including multiple types of fluorophores is illustrated. The imaging apparatus 200 illustrated in FIG. 11 includes: a first light source 20a; a second light source 20b; an optical element 21; an irradiation optical system 22; the optical system 30; the filter array 40; the image sensor 50; and the processing circuit 60 that controls the first light source 20a, the second light source 20b, and the image sensor 50. The imaging apparatus 200 illustrated in FIG. 11 differs from the imaging apparatus 100 illustrated in FIG. 4 in that the imaging apparatus 200 includes, instead of the light source 20 illustrated in FIG. 4, the first light source 20a, the second light source 20b, the optical element 21, and the irradiation optical system 22 illustrated in FIG. 11. The number of light sources, which is two in FIG. 11, may be three or more in accordance with purpose and use.

The first light source 20a emits first excitation light 20L1a. The second light source 20b emits second excitation light 20L1b. The spectrum of the first excitation light 20L1a and the spectrum of the second excitation light 20L1b differ from each other. As in the first embodiment, both spectra are broad. The meaning of "broad" has been described in the first embodiment. The first excitation light 20L1a is light that is capable of exciting a first fluorophore that is a type of fluorophore included in the object 10. The second excitation light 20L1b is light that is capable of exciting a second fluorophore that is another type of fluorophore included in the object 10. The absorption spectrum of the first fluorophore and the absorption spectrum of the second fluorophore differ from each other. Likewise, the fluorescence spectrum of the first fluorophore and the fluorescence spectrum of second fluorophore differ from each other.

When the object 10 is irradiated with the first excitation light 20L1a, first object light 20L2a is generated. The first object light 20L2a includes first fluorescent light, which is emitted by the first fluorophore included in the object 10 by absorbing the first excitation light 20L1a, and reflection light of the first excitation light 20L1a reflected by the object 10. Likewise, when the object 10 is irradiated with the second excitation light 20L1b, second object light 20L2b is generated. The second object light 20L2b includes second fluorescent light, which is emitted by the second fluorophore included in the object 10 by absorbing the second excitation light 20L1b, and reflection light of the second excitation light 20L1b reflected by the object 10.

The optical element 21 transmits the first excitation light 20L1a toward the irradiation optical system 22, and reflects the second excitation light 20L1b toward the irradiation optical system 22. The optical element 21 may be, for example, a dichroic mirror or a half mirror.

The irradiation optical system 22 irradiates the object 10 with the first excitation light 20L1a or the second excitation light 20L1b. The irradiation optical system 22 may include, for example, a lens, a curved mirror, or a light diffusion plate.

The processing circuit 60 switches between a first operation of causing the first light source 20a to emit the first excitation light 20L1a and a second operation of causing the second light source 20b to emit the second excitation light 20L1b. A mechanical drive unit is not necessary to switch between the first operation and the second operation. With the imaging apparatus 200 according to the second embodiment, it is possible to emit excitation light suitable for multiple types of fluorophores included in the object 10 by switching between the first operation and the second operation.

Here, an example in which the object 10 includes Cy5.5 in addition to Cy3 and Cy5 described above will be described. A combination of the fluorophores Cy3, Cy5, and Cy5.5 is generally used, for example, in the m-FISH method for genetic screening. In this example, the first fluorophore is Cy3 or Cy5, and the second fluorophore is Cy5.5.

Figure 12A:
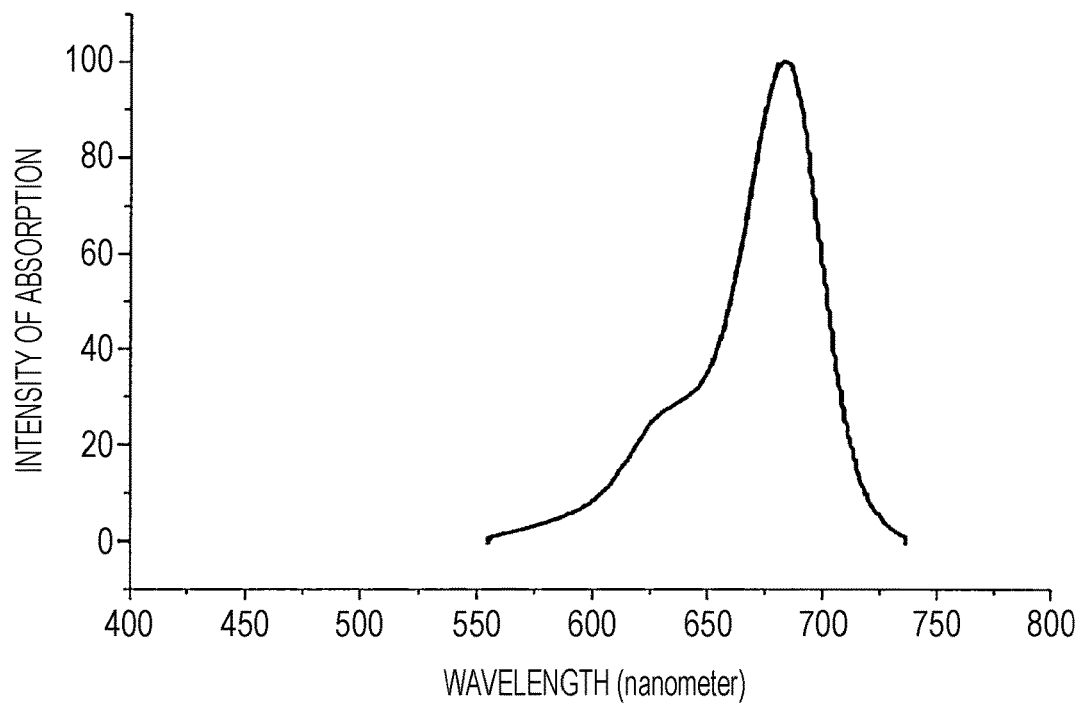
FIG. 12A is a graph illustrating the absorption spectrum of Cy5.5.
Figure 12B:
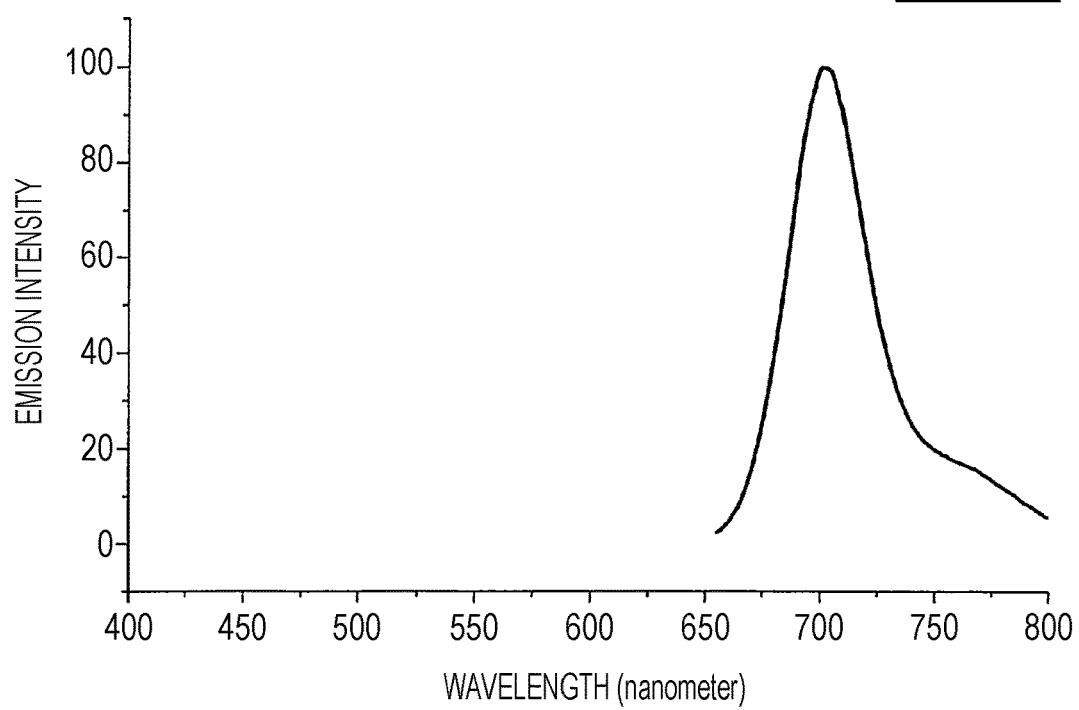
FIG. 12B is a graph illustrating the fluorescence spectrum of Cy5.5.

FIGS. 12A and 12B are graphs respectively illustrating the absorption spectrum and the fluorescence spectrum of Cy5.5. As illustrated in FIG. 12A, in contrast to the absorption spectra of Cy3 and Cy5, the absorption spectrum of Cy5.5 does not have effective absorptance in the wavelength region of greater than or equal to 500 nm and less than or equal to 600 nm. Accordingly, with the excitation light having a spectrum whose wavelength region is greater than or equal to 500 nm and less than or equal to 600 nm, it is not possible to excite Cy5.5 efficiently, and it is not possible to observe a fluorescence image of Cy5.5.

As illustrated in FIG. 12A, the absorption spectrum of Cy5.5 has effective absorptance in a wavelength region of greater than or equal to 600 nm and less than or equal to 700 nm. As illustrated in FIG. 12B, the fluorescence spectrum of Cy5.5 does not have effective fluorescent light intensity on the shorter wavelength side than 675 nm. With excitation light whose wavelength region of the spectrum is greater than or equal to 600 nm and less than or equal to 675 nm, it is possible to excite Cy5.5 efficiently, and it is possible to observe the fluorescence image of Cy5.5. However, with excitation light having high intensity in the wavelength region, it is not possible to excite Cy3 efficiently.

It is assumed that the wavelength region of the spectrum of the first excitation light 20L1a is greater than or equal to 500 nm and less than or equal to 600 nm and the wavelength region of the spectrum of the second excitation light 20L1b is greater than or equal to 600 nm and less than or equal to 675 nm. When the fluorescence images of Cy3 and Cy5 are to be observed, the processing circuit 60 performs the first operation. When the fluorescence image of Cy5.5 is to be observed, the processing circuit 60 performs the second operation. As the processing circuit 60 switches between the first operation and the second operation, it is possible to observe the fluorescence images of Cy3, Cy5, and a Cy5.5, and it is possible to know the distribution of these three types of fluorophores in the object 10.

In existing fluorescence imaging, an optical element that blocks excitation light, such as a dichroic mirror or a long-pass filter, is physically replaced in accordance with the type of a fluorophore to be observed. In contrast, with the imaging apparatus 200 according to the second embodiment, since the first operation and the second operation are switched by electrical control by the processing circuit 60, it is possible to observe many types of fluorophores more rapidly, and it is possible to reduce the risk of physical damage such as abrasion. Moreover, it is possible to incorporate the imaging apparatus 200 according to the second embodiment in an imaging system whose physical size is limited, such as an endoscope.

Besides the example described above, the first excitation light 20L1a may be used to observe a transmission image and/or a reflection image, and the second excitation light 20L1b may be used to observe a fluorescence image. In this case, the first excitation light 20L1a is white light, and the second excitation light 20L1b is light that is capable of exciting a fluorophore included in the object 10. With the imaging apparatus 200 according to the second embodiment, it is possible to observe the entirety of the object 10 by observing the transmission image and/or the reflection image of the object 10 by the first operation. Moreover, it is possible to observe a specific region in the object 10 by observing the fluorescence image of the object 10 by the second operation.

For example, in endoscopy, a reflection image due to white light is effective in observing the entirety of a gastric wall and/or an intestinal tract, and a fluorescence image that is obtained by accumulating a fluorophore in a tumor site and exciting the fluorophore is effective in accentuating and identifying the tumor site. With the imaging apparatus 200 according to the second embodiment, since it is possible to switch between the first operation and the second operation rapidly, for example, it is possible to obtain a fluorescence image and a reflection image of the object 10 due to white light even when the object 10 deforms due to peristalsis motion.

Example of Configuration of Light Source

Figure 13:
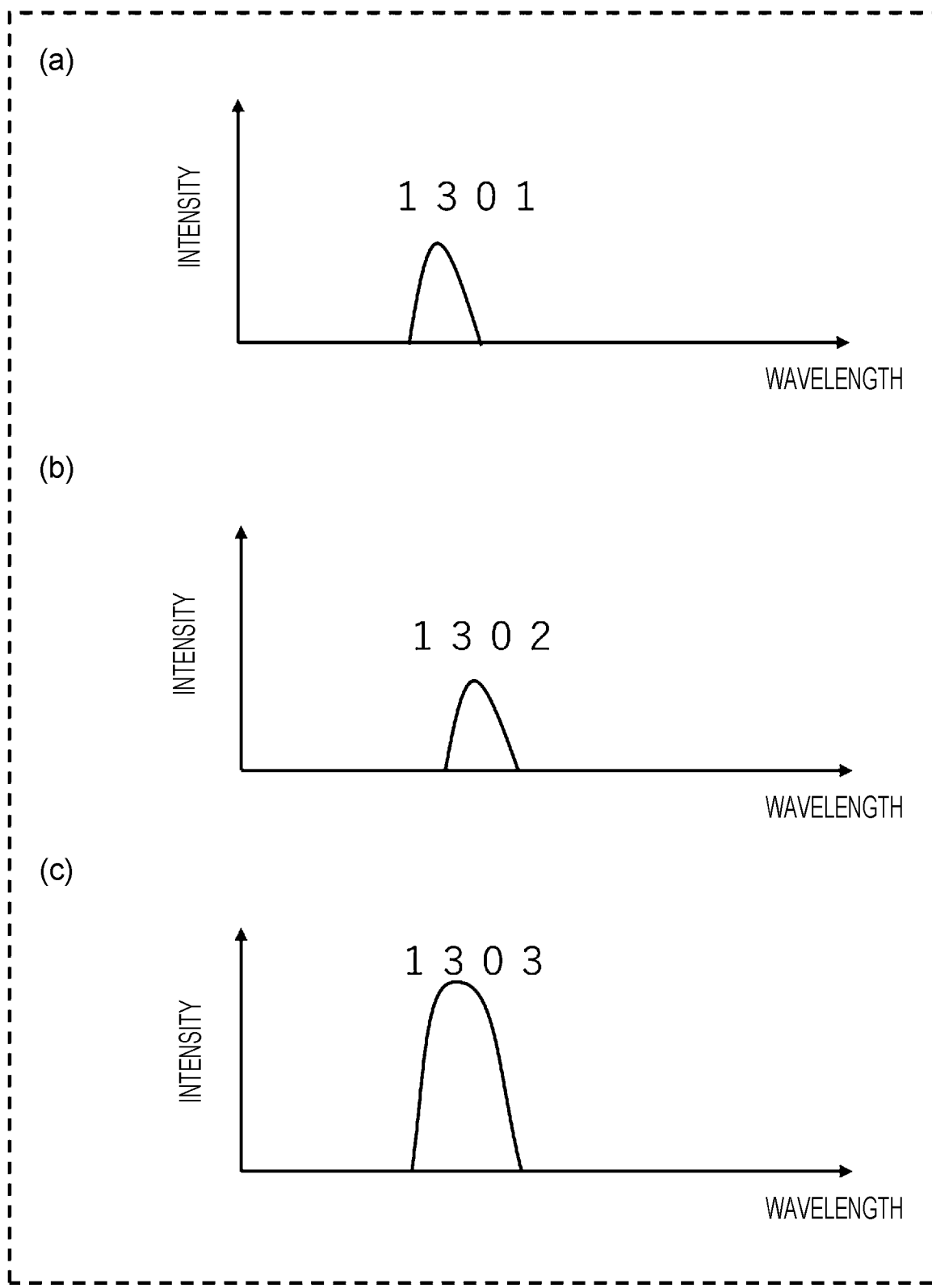
FIG. 13 schematically illustrates (a) the spectrum of excitation light of a first LED, (b) the spectrum of excitation light of a second LED, and (c) the spectrum of excitation light with which an object is to be irradiated.

Referring to FIG. 13, the configuration of a light source in the embodiments described above will be described. FIG. 13 schematically illustrates (a) the spectrum of excitation light of a first LED, (b) the spectrum of excitation light of a second LED, and (c) the spectrum of excitation light with which an object is to be irradiated.

A light source that emits excitation light whose spectrum is broad can be configured by combining multiple light sources. For example, it is possible to cause multiple light sources whose spectra differ to function as a broad light source by irradiating an object simultaneously with excitation light of the multiple light sources.

For example, by irradiating an object simultaneously with excitation light of the first LED having a first spectrum 1301 illustrated in FIG. 13 (*a*) and excitation light of the second LED having a second spectrum 1302 illustrated in FIG. 13 (*b*), it is possible to obtain the same effect as that of irradiation of the object with excitation light having a broad spectrum 1303 illustrated in FIG. 13 (*c*).

An object may be irradiated with excitation light of two LEDs through different optical systems. Alternatively, an object may be irradiated with excitation light of two LEDs after joining the light beams by using a half mirror, a dichroic mirror, or the like.

Here, the first spectrum of the first LED and the second spectrum of the second LED may or may not have an overlap. For example, three or more light sources whose spectra differ from each other may be provided, and a combination of the light sources that are activated simultaneously may be changed in accordance with the type of the object.

It is possible to substantially configure a light source that emits excitation light whose spectrum is broad by switching between multiple light sources to be activated as described above. The image sensor 50 in the embodiments described above usually outputs, as a received light signal, charges that are accumulated in a period called an exposure time. Therefore, changes in the illuminance of incident light that occurs in the exposure time are averaged out in the received light signal. Thus, by irradiating an object with excitation light of multiple light sources whose spectra differ while switching between the light sources in the exposure time, it is possible to substantially obtain an effect similar to that of irradiation of the object with excitation light having a spectrum that is the average of the spectra.

Instead of the multiple light sources described above, a wavelength-tunable light source that can change the spectrum thereof with time, such as a wavelength tunable laser, may be used. By changing the spectrum of the wavelength tunable laser in the exposure time, it is possible to obtain an effect equivalent to that of switching between light sources.

Supplement 1

An imaging method according to one aspect of the present disclosure may be as follows.

The imaging apparatus 100 includes a memory that stores commands. The processing circuit 60 includes one or more computers that read out and execute the commands.

The commands include a command for causing the light source 20 to emit excitation light.

The excitation light is emitted, thereby the excitation light irradiating the object 10, first light from the object 10 irradiated with the excitation light entering the filter array 40, second light from the filter array 40 in response to the incident of the first light entering the image sensor 50. The first light includes third light outputted from the object in response to the object absorbing a part of the excitation light and fourth light resulting from reflection of a part of the excitation light on the object 10.

The commands include a command for causing the processing circuit 60 to generate images corresponding to wavelength regions on the basis of the second light entering the image sensor 50.

The filter array 40 includes a first filter and a second filter.

All wavelengths corresponding to transmittances that are higher than or equal to a first transmittance in a transmission spectrum of the first filter are included in a first range. All wavelengths corresponding to transmittances that are higher than or equal to a second transmittance in a transmission spectrum of the second filter are included in a second range. The first range differs from the second range.

A first spectrum of the excitation light has a rectangular shape, and all wavelengths corresponding to intensities that are higher than or equal to a first intensity in the first spectrum are included in a third range.

A fourth range is a part of the third range. The fourth range overlaps a part or all of the first range. A fifth range is a part of the third range The fifth rage overlaps a part or all of the second range. The fourth range differs from the fifth range.

The first transmittance may be $1/10$ of a maximum transmittance in the transmission spectrum of the first filter, the second transmittance may be $1/10$ of a maximum transmittance in the transmission spectrum of the second filter, and the first intensity may be $1/10$ of a maximum intensity in the first spectrum.

Supplement 2

The present disclosure is not limited to the first and second embodiments and the modifications. Various modifications of the embodiments and the modifications conceived by a person having ordinary skill in the art and configurations including a combination of elements of different embodiments and/or different modifications may be included in the scope of the present disclosure as long as they are within the gist of the present disclosure.

The technology of the present disclosure is applicable to, for example, the field of biotechnology research or the medical field for diagnosis of cancer or serious diseases.

What is claimed is:

1. An imaging apparatus comprising:
   at least one light source that emits excitation light for irradiating an object, the object including at least one light emitter;
   a coding filter array including filters whose transmission spectra differ from each other;
   an image sensor that captures an image of object light, which is generated by irradiating the object with the excitation light, through the coding filter array and generates compressed image data; and
   a processing circuit that generates hyperspectral image data based on the compressed image data,
   wherein the object light includes emission light, which is produced by the at least one light emitter by absorbing the excitation light, and reflection light of the excitation light reflected by the object,
   wherein the filters include two filters whose transmission spectra differ from each other,
   wherein a spectrum of the excitation light overlaps a transmission region in the transmission spectrum of each of the two filters,
   wherein the two filters include a first filter, and
   wherein a half-width of the spectrum of the excitation light is wider than a half-width of a first transmission peak of a transmission spectrum of the first filter.

2. The imaging apparatus according to claim 1,
   wherein the two filters are the first filter and a second filter, and
   wherein the spectrum of the excitation light overlaps a first transmission peak in a transmission spectrum of the first filter and a second transmission peak in a transmission spectrum of the second filter.

3. The imaging apparatus according to claim 1,
   wherein the light source includes an LED or a superluminescent diode.

4. The imaging apparatus according to claim 1,
   wherein the at least one light source includes a first light source that emits first excitation light and a second light source that emits second excitation light, and a spectrum of the first excitation light and a spectrum of the second excitation light differ from each other, and
   wherein the processing circuit switches between an operation of causing the first light source to emit the first excitation light and an operation of causing the second light source to emit the second excitation light.

5. The imaging apparatus according to claim 4,
   wherein the at least one light emitter includes a first light emitter and a second light emitter, and a first absorption spectrum of the first light emitter and a second absorption spectrum of the second light emitter differ from each other,
   wherein the first excitation light is light that is capable of exciting the first light emitter, and
   wherein the second excitation light is light that is capable of exciting the second light emitter.

6. The imaging apparatus according to claim 4,
   wherein the first excitation light is white light, and
   wherein the second excitation light is light that is capable of exciting the at least one light emitter.

7. The imaging apparatus according to claim 1,
   wherein the at least one light source includes a first light source that emits first excitation light and a second light source that emits second excitation light, and a spectrum of the first excitation light and a spectrum of the second excitation light differ from each other, and
   wherein the processing circuit causes the first light source to emit the first excitation light and causes the second light source to emit the second excitation light simultaneously.

8. The imaging apparatus according to claim 1,
   wherein the at least one light source includes a first light source that emits first excitation light and a second light source that emits second excitation light, and a spectrum of the first excitation light and a spectrum of the second excitation light differ from each other, and
   wherein the processing circuit switches, in an exposure time of the image sensor, between an operation of causing the first light source to emit the first excitation light and an operation of causing the second light source to emit the second excitation light.

9. The imaging apparatus according to claim 1,
   wherein the at least one light source is a wavelength-tunable light source, and wherein the processing circuit changes, in an exposure time of the image sensor, a spectrum of the excitation light emitted from the wavelength wavelength-tunable light source.

10. An imaging comprising:
at least one light source that emits excitation light for irradiating an object, the object including at least one light emitter;
a coding filter array including filters whose transmission spectra differ from each other;
an image sensor that captures an image of object light, which is generated by irradiating the object with the excitation light, through the coding filter array and generates compressed image data; and
a processing circuit that generates hyperspectral image data based on the compressed image data,
wherein the object light includes emission light, which is produced by the at least one light emitter by absorbing the excitation light, and reflection light of the excitation light reflected by the object,
wherein the filters include two filters whose transmission spectra differ from each other,
wherein a spectrum of the excitation light overlaps a transmission region in the transmission spectrum of each of the two filters,
wherein the two filters include a first filter, and
wherein a wavelength region having an intensity that is higher than or equal to a half of a highest intensity in the spectrum of the excitation light includes a wavelength region having an intensity that is higher than or equal to a half of a highest intensity in a first transmission peak in a transmission spectrum of the first filter.

11. An imaging apparatus comprising:
at least one light source that emits excitation light for irradiating an object, the object including at least one light emitter;
a coding filter array including filters whose transmission spectra differ from each other;
an image sensor that captures an image of object light, which is generated by irradiating the object with the excitation light, through the coding filter array and generates compressed image data; and
a processing circuit that generates hyperspectral image data based on the compressed image data,
wherein the object light includes emission light, which is produced by the at least one light emitter by absorbing the excitation light, and reflection light of the excitation light reflected by the object,
wherein the filters include two filters whose transmission spectra differ from each other,
wherein a spectrum of the excitation light overlaps a transmission region in the transmission spectrum of each of the two filters,
wherein the spectrum of the excitation light has a wavelength region that overlaps an absorption spectrum of the at least one light emitter, and
wherein an emission spectrum of the at least one light emitter has a wavelength region that does not overlap a spectrum of the reflection light of the excitation light.

* * * * *